US012015917B2

(12) United States Patent
Gundavelli et al.

(10) Patent No.: US 12,015,917 B2
(45) Date of Patent: *Jun. 18, 2024

(54) DELIVERING STANDALONE NON-PUBLIC NETWORK (SNPN) CREDENTIALS FROM AN ENTERPRISE AUTHENTICATION SERVER TO A USER EQUIPMENT OVER EXTENSIBLE AUTHENTICATION PROTOCOL (EAP)

(71) Applicant: Cisco Technology, Inc., San Jose, CA (US)

(72) Inventors: Srinath Gundavelli, San Jose, CA (US); Indermeet Singh Gandhi, San Jose, CA (US); Timothy Peter Stammers, Raleigh, NC (US); Vimal Srivastava, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/358,569

(22) Filed: Jul. 25, 2023

(65) Prior Publication Data
US 2023/0370841 A1 Nov. 16, 2023

Related U.S. Application Data

(63) Continuation of application No. 17/101,071, filed on Nov. 23, 2020, now Pat. No. 11,785,456.
(Continued)

(51) Int. Cl.
*H04W 12/06* (2021.01)
*H04W 12/04* (2021.01)
*H04W 84/04* (2009.01)

(52) U.S. Cl.
CPC .......... *H04W 12/06* (2013.01); *H04W 12/04* (2013.01); *H04W 84/042* (2013.01)

(58) Field of Classification Search
CPC .............................. H04W 12/04; H04W 12/06
See application file for complete search history.

(56) References Cited

U.S. PATENT DOCUMENTS 9,137,656 B2  9/2015  O'Leary
10,178,242 B2  1/2019  Guday et al.
(Continued)

OTHER PUBLICATIONS

Q. Tang, O. Ermis, C. D. Nguyen, A. D. Oliveira and A. Hirtzig, "A Systematic Analysis of 5G Networks With a Focus on 5G Core Security," in IEEE Access, vol. 10, pp. 18298-18319, 2022. (Year: 2022).*

(Continued)

*Primary Examiner* — Kari L Schmidt
(74) *Attorney, Agent, or Firm* — Edell, Shapiro & Finnan, LLC

(57) ABSTRACT

Presented herein are techniques to facilitate delivering standalone non-public network (SNPN) credentials from an enterprise authentication server to a user equipment (UE) using an Extensible Authentication Protocol (EAP) process. In one example, a method may include determining, by an authentication server of an enterprise, that a UE for the enterprise is to receive credentials to enable the UE to connect to a SNPN of the enterprise in which the determining is performed based, at least in part, on connection of the UE to an access network that is different than the SNPN for the enterprise; and performing an authentication process with the UE by the authentication server in which the authentication process includes providing the credentials to the UE via a first authentication message and obtaining confirmation from the UE via a second authentication mes-
(Continued)

sage that indicates successful provisioning of the credentials for the UE.

20 Claims, 14 Drawing Sheets

Related U.S. Application Data

(60) Provisional application No. 63/066,893, filed on Aug. 18, 2020.

(56) References Cited

U.S. PATENT DOCUMENTS

| | | | |
|---|---|---|---|
| 10,200,837 B1 | 2/2019 | Steck | |
| 10,206,110 B1 | 2/2019 | Shavell et al. | |
| 10,440,558 B1 | 10/2019 | De Figueiredo Junior et al. | |
| 10,484,939 B2 | 11/2019 | Wong et al. | |
| 11,234,132 B1 | 1/2022 | Sicard et al. | |
| 11,564,081 B1 | 1/2023 | Gundavelli et al. | |
| 2005/0088999 A1 | 4/2005 | Waylett et al. | |
| 2009/0031138 A1 | 1/2009 | Nakhjiri | |
| 2014/0204927 A1 | 7/2014 | Horn et al. | |
| 2014/0295840 A1 | 10/2014 | Keskitalo et al. | |
| 2015/0350168 A1 | 12/2015 | Hayton | |
| 2016/0029213 A1 | 1/2016 | Rajadurai et al. | |
| 2016/0277391 A1 | 9/2016 | Choyi et al. | |
| 2017/0041296 A1 | 2/2017 | Ford et al. | |
| 2017/0149795 A1 | 5/2017 | Day, II | |
| 2018/0160294 A1 | 6/2018 | Lee et al. | |
| 2018/0203123 A1 | 7/2018 | Masuda | |
| 2018/0206123 A1 | 7/2018 | Guday et al. | |
| 2018/0227759 A1 | 8/2018 | Liu | |
| 2019/0075453 A1 | 3/2019 | Yoon et al. | |
| 2019/0141605 A1 | 5/2019 | Watson et al. | |
| 2019/0230510 A1 | 7/2019 | Ben Henda et al. | |
| 2019/0335330 A1 | 10/2019 | Salkintzis | |
| 2020/0045541 A1 | 2/2020 | Kreishan | |
| 2020/0050439 A1 | 2/2020 | Bjordal et al. | |
| 2020/0052907 A1 | 2/2020 | Park et al. | |
| 2020/0106768 A1 | 4/2020 | Lambiase et al. | |
| 2020/0242603 A1 | 7/2020 | Salkintzis | |
| 2020/0275279 A1 | 8/2020 | Tangudu et al. | |
| 2020/0288300 A1 | 9/2020 | Oswal et al. | |
| 2021/0051478 A1 | 2/2021 | Avula et al. | |
| 2021/0051566 A1 | 2/2021 | Tiwari et al. | |
| 2021/0051577 A1 | 2/2021 | Won | |
| 2021/0058784 A1 | 2/2021 | Kedalagudde et al. | |
| 2021/0099869 A1 | 4/2021 | Palanigounder et al. | |
| 2021/0099968 A1 | 4/2021 | Tiwari et al. | |
| 2021/0105712 A1 | 4/2021 | Speicher et al. | |
| 2021/0211879 A1 | 7/2021 | Zisimopoulos et al. | |
| 2021/0211975 A1 | 7/2021 | Prabhakar et al. | |
| 2021/0258857 A1 | 8/2021 | Won | |
| 2021/0306853 A1 | 9/2021 | Gundavelli et al. | |
| 2021/0345226 A1 | 11/2021 | Liao et al. | |
| 2021/0385742 A1 | 12/2021 | Liao | |
| 2021/0400489 A1 | 12/2021 | Starsinic et al. | |
| 2022/0038898 A1 | 2/2022 | Stojanovski et al. | |
| 2022/0039040 A1 | 2/2022 | Nair et al. | |
| 2022/0159460 A1 | 5/2022 | Ben Henda et al. | |
| 2022/0240147 A1 | 7/2022 | Wolfner et al. | |
| 2023/0015696 A1 | 1/2023 | Speicher et al. | |
| 2023/0016347 A1 | 1/2023 | Nair et al. | |
| 2023/0057968 A1 | 2/2023 | Sharma et al. | |
| 2023/0075285 A1* | 3/2023 | Jung | H04W 48/08 |
| 2023/0156470 A1* | 5/2023 | Kweon | H04W 12/72 455/410 |
| 2023/0189001 A1* | 6/2023 | Dees | H04W 8/205 455/411 |
| 2023/0199474 A1* | 6/2023 | Qidwai | H04W 48/16 455/558 |
| 2023/0199605 A1* | 6/2023 | Watfa | H04W 76/18 370/331 |
| 2023/0209489 A1* | 6/2023 | Sugawara | H04W 60/04 370/329 |
| 2023/0232369 A1* | 7/2023 | Lin | H04W 68/025 455/435.1 |
| 2023/0262637 A1* | 8/2023 | Sugawara | H04W 60/04 455/435.1 |
| 2023/0284119 A1* | 9/2023 | Kim | H04W 60/00 370/329 |
| 2023/0292125 A1* | 9/2023 | Ben Henda | H04W 12/06 |

OTHER PUBLICATIONS

R. Borgaonkar and M. G. Jaatun, "5G as an Enabler for Secure IoT in the Smart Grid : Invited Paper," 2019 First International Conference on Societal Automation (SA), Krakow, Poland, 2019, pp. 1-7. (Year: 2019).*

Aboba, B., et al., "Extensible Authentication Protocol (EAP) Key Management Framework," Network Working Group, Request for Comments: 5247, Updates: 3748, Category: Standards Track, Aug. 2008, 79 pages.

Aboba, B., et al., "Extensible Authentication Protocol (EAP)," Network Working Group, Request for Comments: 3748, Obsoletes: 2284, Category: Standards Track, Jun. 2004, 67 pages.

Android Open Source Project: "Implementing eSIM," AOSP, last updated May 4, 2020, 14 Pages.

Arkko, J., et al., "Extensible Authentication Protocol Method for 3rd Generation Authentication and Key Agreement (EAP-AKA)," Network Working Group, Request for Comments: 4187, Category: Informational, Jan. 2006, 79 pages.

Arkko, J., et al., "Improved Extensible Authentication Protocol Method for 3rd Generation Authentication and Key Agreement (EAP-AKA)," Network Working Group, Request for Comments: 5448, Updates: 4187, Category: Informational, May 2009, 29 Pages.

Cooper, D., et al., "Internet X.509 Public Key Infrastructure Certificate and Certificate Revocation List (CRL) Profile," Network Working Group, Request for Comments: 5280, Obsoletes: 3280, 4325, 4630, Category: Standards Track, May 2008, 151 Pages.

Funk, P., et al., "Extensible Authentication Protocol Tunneled Transport Layer Security Authenticated Protocol Version 0 (EAP-TTLSv0)," Network Working Group, Request for Comments: 5281, Category: Informational, Aug. 2008, 51 pages.

GSM Association, "eSIM Whitepaper," The What and How of Remote SIM Provisioning, Mar. 2018, 21 Pages.

GSM Association: "RSP Architecture," SGP.21 Version 2.2, Sep. 1, 2017, 95 Pages.

GSM Association: "RSP Technical Specification," Official Document SGP.22, Version 2.1, published Feb. 27, 2017, 247 pages.

GSM Association, "RSP Technical Specification," Version 2.2.1, Official Document SGP.22—RSP Technical Specification, Dec. 2018, 250 Pages.

International Search Report and Written Opinion in Counterpart International Application No. PCT/US2021/045477, dated Oct. 28, 2021, 14 Pages.

Jerichow, A., et al., "3GPP Non-Public Network Security," Journal of Information and Communication Technology, Jan. 4, 2020, vol. 8_1, pp. 57-76, DOI: I0.13052/jicts2245-800X.815.

Kedalagudde., et al., ref. U.S. Appl. No. 62/933,063, filed Nov. 8, 2019. (Year: 2019), 65 Pages.

Palanigounder., et al., U.S. Appl. No. 62/907,494, filed Sep. 27, 2019. (Year: 2019), 20 Pages.

Siemens, V., "KI#1, Solution to Support SNPN Access using 3rd Party Credentials via External Credential Provider—Note on Potential Key Hierarchy Impact," SA WG2 Meeting #140E e-meeting, Aug. 19-Sep. 1, 2020, 4 Pages.

Simon, D., et al., "The EAP-TLS Authentication Protocol," Network Working Group, Request for Comments: 5216, Obsoletes: 2716, Category: Standards Track, Mar. 2008, 34 pages.

Yee, P., et al., "Updates to Internet X.509 Public Key Infrastructure Certificate and Certificate Revocation List (CRL) Profile," Internet

(56) References Cited

OTHER PUBLICATIONS

Engineering Task Force (IETF), Request for Comments: 6818, Updates: 5280, Category: Standards Track, SSN: 2070-1721, Jan. 2013, 8 Pages.

Zhang, X., et al., "Overview of 5G Security in 3GPP", IEEE Conference on Standards for Communications and Networking (CSCN), Helsinki, Finland, 2017, pp. 181-186.

* cited by examiner

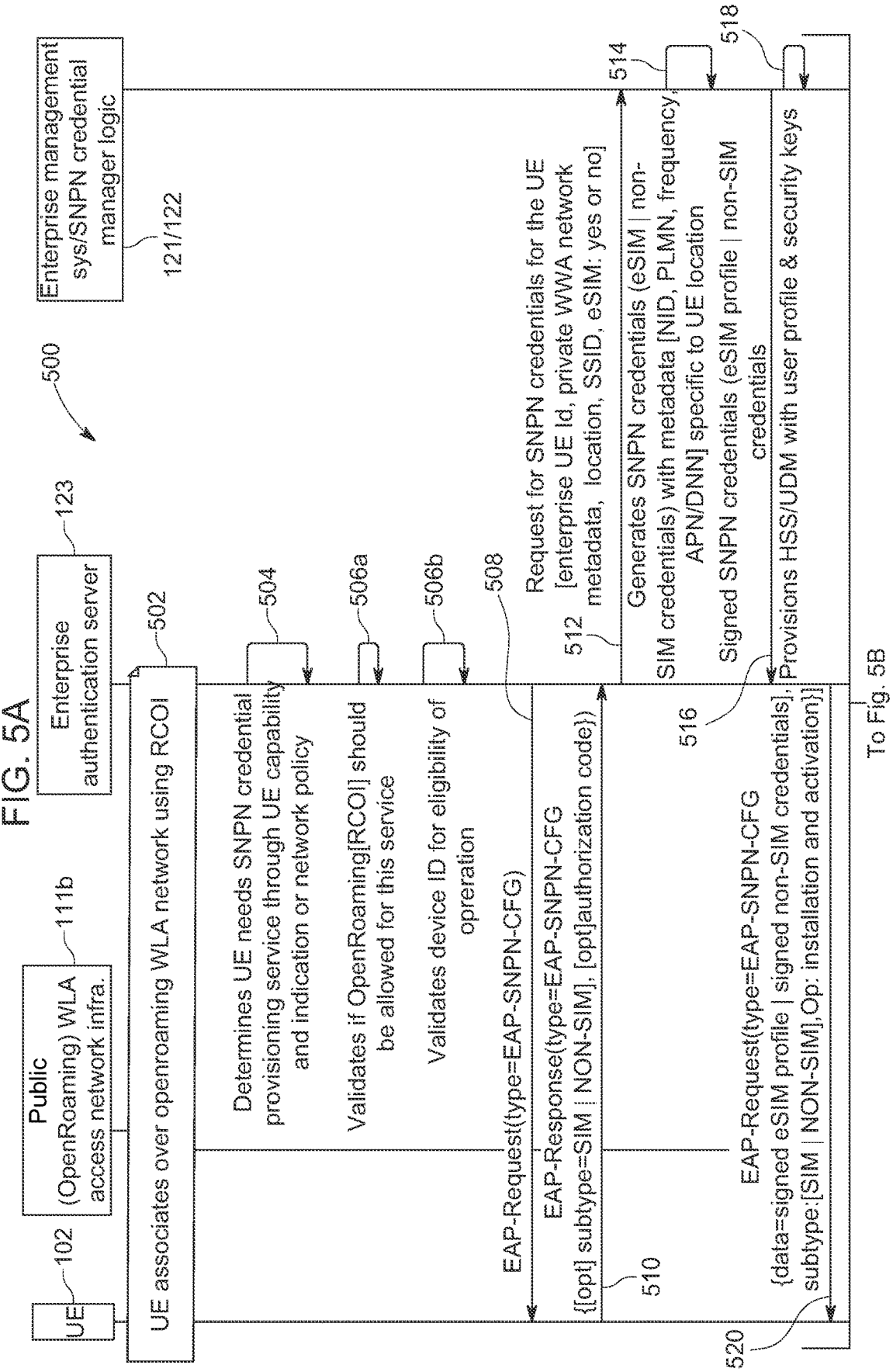

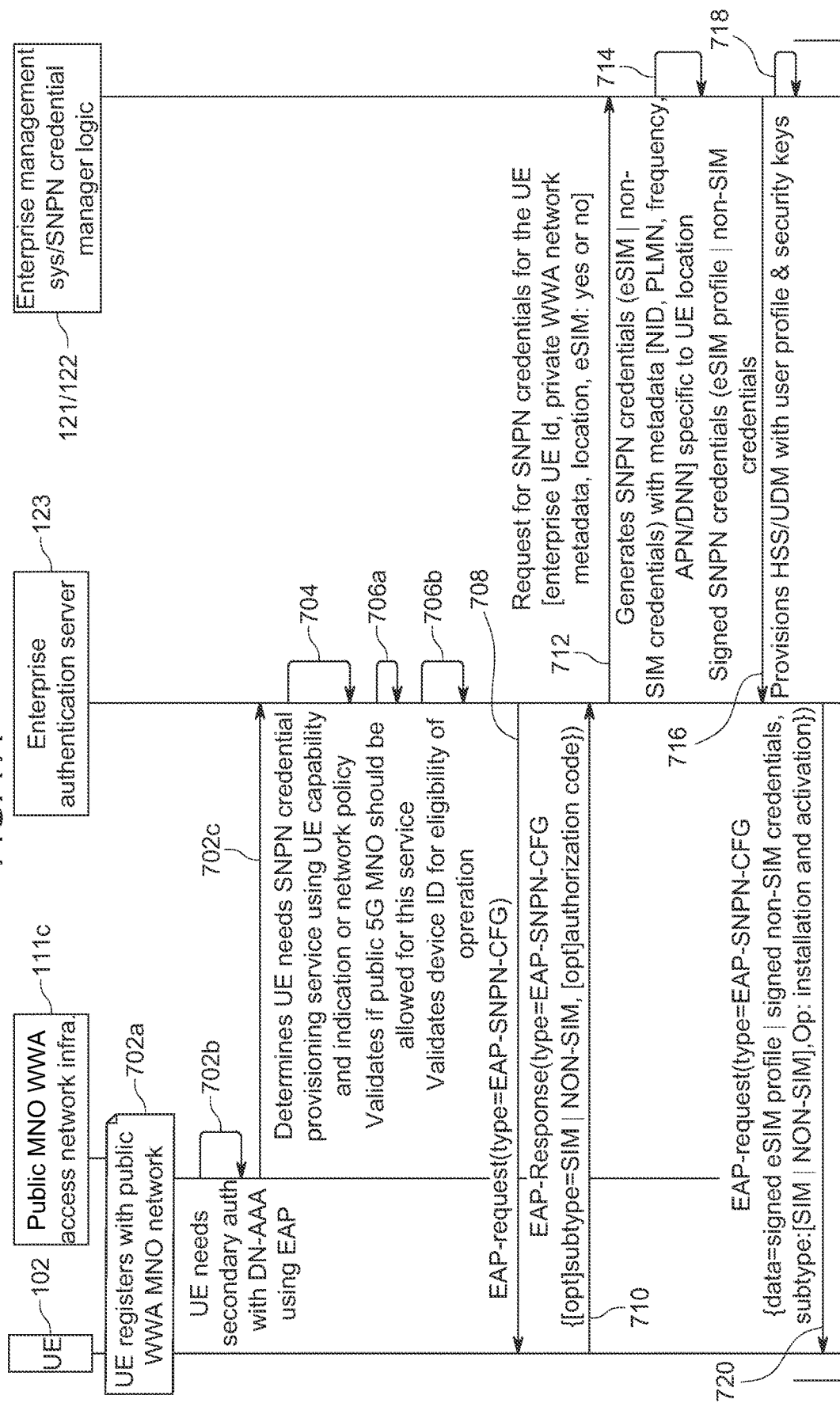

DELIVERING STANDALONE NON-PUBLIC NETWORK (SNPN) CREDENTIALS FROM AN ENTERPRISE AUTHENTICATION SERVER TO A USER EQUIPMENT OVER EXTENSIBLE AUTHENTICATION PROTOCOL (EAP)

PRIORITY CLAIM

This application is a continuation of and claims the benefit of priority to U.S. patent application Ser. No. 17/101,071, filed Nov. 23, 2020, which application claims the benefit of priority under 35 U.S.C. § 119 to U.S. Provisional Application No. 63/066,893, filed Aug. 18, 2020, the entirety of which is incorporated herein by reference.

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. As the number of mobile users increases, efficient management of communication resources becomes more critical. In particular, there are significant challenges in facilitating user equipment authorizations for connecting to networks in various wireless networking architectures.

BRIEF DESCRIPTION OF THE DRAWINGS

FIGS. 5A and 5B are a message sequence diagram illustrating a call flow associated with delivering SNPN credentials to a UE over EAP according to the second example use case illustrated in FIG. 4, according to an example embodiment.

FIGS. 7A and 7B are a message sequence diagram illustrating a call flow associated with delivering SNPN credentials to a UE over EAP according to the third example use case illustrated in FIG. 6, according to an example embodiment.

DESCRIPTION OF EXAMPLE EMBODIMENTS

Overview

Figure 1:
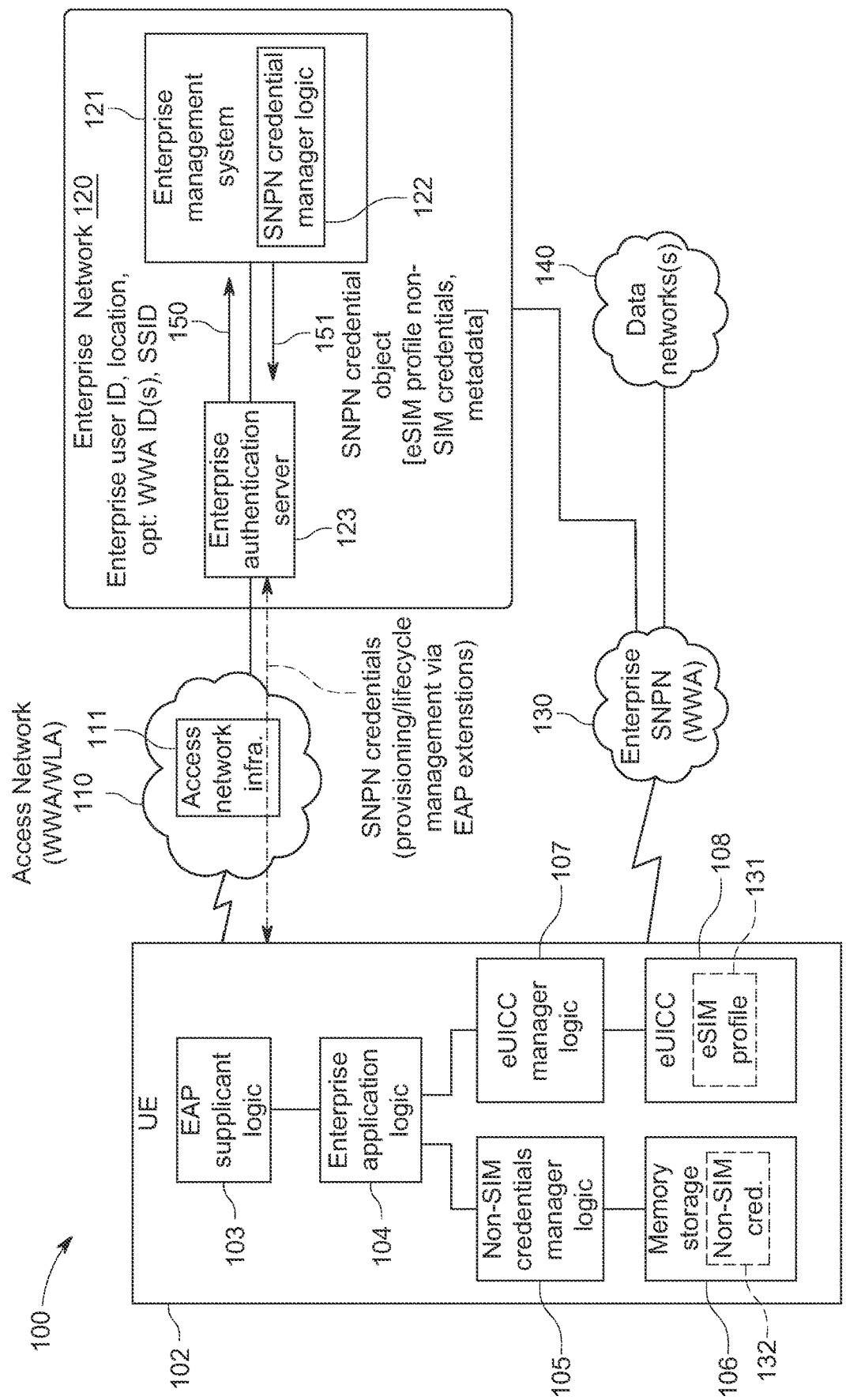
FIG. 1 is a diagram of a system in which techniques that facilitate delivering standalone non-public network (SNPN) credentials from an enterprise authentication server to a user equipment (UE) over Extensible Authentication Protocol (EAP) may be implemented, according to an example embodiment.

Techniques presented herein may facilitate delivering standalone non-public network (SNPN) credentials from an enterprise authentication server to a user equipment (UE) over Extensible Authentication Protocol (EAP) communications.

In one embodiment, a method is provided that may include determining, by an authentication server of an enterprise, that a UE for the enterprise is to receive credentials to enable the UE to connect to a SNPN of the enterprise, wherein the determining is performed based, at least in part, on connection of the UE to an access network that is different than the SNPN for the enterprise; and performing an authentication process with the UE by the authentication server, wherein the authentication process includes providing the credentials to the UE via a first authentication message and obtaining confirmation from the UE via a second authentication message that indicates successful provisioning of the credentials for the UE.

Example Embodiments

As referred to herein, an 'enterprise' or 'enterprise entity' may be considered to be a business, government, educational institution, an organization, and/or the like that may include multiple enterprise locations (or sites), such as a main campus, remote branches, and so on. Enterprise devices (e.g., enterprise user equipment (UE), etc.) that may be owned, operated, and/or otherwise associated with an enterprise may be utilized by enterprise users to serve enterprise purposes (e.g., business purpose, government purpose, educational/university purpose, etc.) of the enterprise. In some instances, an enterprise may operate an enterprise network, also referred to as an enterprise data network, which may be a network implemented to serve enterprise purposes (e.g., host enterprise applications/services/etc., perform authentications and/or authorizations, etc. for enterprise users associated with one or more UE, and/or the like).

Further as referred to herein, a wireless wide area (WWA) access network, such as a cellular/Third (3rd) Generation Partnership Project (3GPP) access networks, may be characterized as a Radio Access Network (RAN) having radio nodes such as evolved Node Bs (eNBs or eNodeBs) for Fourth (4th) Generation (4G)/Long Term Evolution (LTE) access networks, next generation Node Bs (gNBs or gNodeBs) for Fifth (5th) Generation (5G) and/or next Generation (nG) access networks, and/or the like that provide a larger RAN coverage area as compared to the RAN coverage areas typically provided by wireless local area (WLA) radio nodes (e.g., Institute of Electrical and Electronics Engineers (IEEE) 802.11 access points, Wi-Fi® access points, Wi-Fi6® access points, etc.). Stated differently, the WWA RAN coverage area provided by a WWA radio node is typically larger (sometimes orders of magnitude larger) than the WLA RAN coverage area provided by a WLA radio node. Additionally, a WWA RAN radio node can typically provide radio access connectivity for a larger number of devices as compared to a WLA RAN radio node. Depending on implementation, any combination of WWA and/or WLA RANs may be utilized to facilitate connections between one or more devices and any combination of Local Area Networks (LANs), such as an enterprise network for an enterprise location; Wide Area Networks (WANs), such as the Internet, multiple enterprise networks spread across multiple locations; Software Defined WAN (SD-WAN); and/or any other network architecture/environment.

In some instances, an access network, such as a WWA access network, may be referred to as a private access network. By 'private' it is meant that a private WWA access network (e.g., a Citizen Broadband Radio Service (CBRS) access network and/or a 3GPP cellular (4G/LTE, 5G, nG, etc.) access network) may provide network connectivity/services to clients (e.g., users/user equipment/devices/etc.) served by a network operator and/or service provider of the private WWA access network, such as an enterprise. In one example, a private WWA access network may be considered to be a network that may be implemented to serve enterprise purposes (e.g., business purposes, government purposes, educational purposes, etc.) for enterprise clients (e.g., enterprise users/user equipment/devices/etc.) in which the private WWA access network may be operated by any combination of traditional public mobile network operators/service providers, enterprises network operators/service providers (e.g., Cisco®, etc.), and/or third party network operators/service providers (e.g., neutral host network operators/service providers, cloud service providers, etc.). A private WWA access network may also be referred to as a standalone non-public network (SNPN). Cisco is a registered trademark of Cisco Technology, Inc.

Referring to FIG. 1, FIG. 1 is a block diagram of a system 100 in which techniques that facilitate delivering SNPN credentials from an enterprise authentication server to a UE over EAP may be implemented, according to an example embodiment. As referred to herein SNPN credentials may broadly refer to any combination of Subscriber Identity Module (SIM) based or non-SIM based profiles and/or credentials.

System 100 includes an enterprise UE 102 (referred to generally as UE 102), an access network (AN) 110, an enterprise network 120, an enterprise SNPN 130, and one or more data network(s) 140.

Access network 110 may include access network infrastructure (infra.) 111. Enterprise network 120 may be associated with an enterprise entity (e.g., a business, government, educational, etc. entity) and may include an enterprise management system 121, which may interface with an enterprise authentication server 123. In one instance, enterprise network 120 may be implemented via an enterprise cloud. Enterprise management system 121 may include SNPN credential manager logic 122. In various embodiments, data network(s) 140 may be any combination of the Internet, an Internet Protocol (IP) Multimedia Subsystem (IMS), Ethernet network, Ethernet switching system(s), and/or the like. In some instances, data network(s) 140 may overlap in whole or in part with enterprise network 120.

Generally, UE 102 may interface with enterprise authentication server 123 via one or more over-the-air Radio Frequency (RF) connections with access network 110 via access network infrastructure. In at least one embodiment, UE 102 may include Extensible Authentication Protocol (EAP) supplicant logic 103, enterprise application logic 104, non-SIM credentials manager logic 105, memory/storage 106, embedded Universal Integrated Circuit Card (eUICC) manager logic 107, and an eUICC 108 (also sometimes referred to as an eUICC chip). For UE 102, EAP supplicant logic 103 may interface with enterprise application logic 104. Enterprise application logic 104 may further interface with non-SIM credentials manager logic 105, which may further interface with memory/storage 106. Enterprise application logic 104 may further interface with eUICC manager logic 107, which may further interface with eUICC 108. In some instances, elements/logic of UE 102 may interface via a bus. Various features/operations associated with elements/logic/memory/storage 103, 104, 105, 106, 107, and 108 for UE 102 are discussed in further detail herein.

Although not illustrated in FIG. 1, it is to be understood that UE 102 may also include any combination of hardware (e.g., communications units, receiver(s), transmitter(s), antenna(s) and/or antenna array(s), processor(s), memory element(s), baseband processor(s) (modems), etc.)], controllers, software, logic, and/or the like to facilitate any combination of over-the-air RF access network connections with access network 110 and enterprise SNPN 130 (upon obtaining SNPN credentials to connect to the enterprise SNPN 130, as discussed herein). In some instances, UE 102 may also be capable of wired interface connections.

In various embodiments, a UE, such as UE 102, may be associated with any enterprise user, subscriber, employee, client, customer, electronic device, etc. that may seek to initiate a flow in system 100 and may be inclusive of any device that initiates a communication in the system, such as a computer, an electronic device such as an industrial device, automation device, enterprise device, appliance, Internet of Things (IoT) device, etc., a laptop or electronic notebook, a cellular/Wi-Fi® enabled telephone/smart phone, tablet, etc. and/or any other device, component, element, or object capable of initiating voice, audio, video, media, or data exchanges within system 100. It is to be understood that UE 102 may also be referred to as user/UE 102 and variations thereof.

In at least one embodiment, access network 110 may be any combination of public WWA and/or third-party or enterprise operated WLA access networks (e.g., third-party OpenRoaming™ Wi-Fi networks or an enterprise network operated by the enterprise entity associated with enterprise network 120), which may be inclusive of one or more RANs for one or more Radio Access Technology (RAT) types that may be facilitated via various access network infrastructure (infra) 111. Various example use cases described herein consider different access network deployments that may be utilized to facilitate delivering SNPN credentials to UE 102 over EAP. Although not illustrated, in some instances, access network 110 may interface with data network(s) 140.

Generally, access network infrastructure 111 may include any combination of radio nodes [sometimes referred to as access points (APs)], which may include any combination of hardware (e.g., communications units, receiver(s), transmitter(s), antenna(s) and/or antenna array(s), processor(s), memory element(s), baseband processor(s) (modems), etc.)], mobile core network elements, controllers, software, logic, and/or any other elements/entities that may facilitate access network connections for one or more elements of a system.

In various embodiments, access network 110 as discussed herein may provide, via one or more radio node(s), RAN coverage for any combination of licensed spectrum WWA access networks, such as access networks (e.g., 4G/LTE, 5G, nG, etc. access networks), unlicensed spectrum non-3GPP WLA access networks (e.g., Institute of Electrical and Electronic Engineers (IEEE) 802.11 (Wi-Fi®), IEEE 802.16 (WiMAX®), etc. access networks), unlicensed spectrum 3GPP access networks (e.g., License Assisted Access (LAA), enhanced LAA (eLAA), New Radio Unlicensed (NR-U), etc. access networks), and/or the like. Thus, radios/access points for access networks discussed herein may include any combination of 4G/LTE evolved Node Bs (eNBs or eNodeBs), 5G/next generation NodeB (gNB), Wi-Fi® APs, and/or any other radio devices now known here or hereafter developed that may facilitate over-the-air Radio Frequency (RF) connections with one or more devices, such as UE discussed herein. In some embodiments, access networks discussed herein may be representative of Open-Roaming™ (OR) access networks (e.g., HotSpot2.0 access networks configured according to OpenRoaming Consortium standards).

Thus, in various embodiments, access network infrastructure 111 for a 4G/LTE WWA access network may include any number of eNBs and 3GPP 4G/LTE mobile core network elements, such as a Mobility Management Entity (MMEs), a Home Subscriber Server (HSS), a Serving Gateway (SGW), a Packet Data Network (PDN) Gateway (PGW). In various embodiments, access network infrastructure 111 for a 5G/nG/CBRS WWA access network may include any number of gNBs/CBRS devices (CBSDs) and 5G/nG mobile core network elements, such as an Access and Mobility Management Function (AMF), a Session Management Functions (SMF), a Unified Data Management (UDM) entity, and a User Plane Function (UPF). In various embodiments, access network infrastructure for a WLA (e.g., Wi-Fi) access network may include any number of Wi-Fi access points (APs), and a wireless local area network (LAN) controller (WLC).

In various embodiments, enterprise SNPN 130 may be implemented as any combination of WWA access network(s) (e.g., 4G/5G/nG/CBRS access network(s)) that are managed/operated by the enterprise entity associated with enterprise network 120. Although not illustrated in FIG. 1, it is to be understood that enterprise SNPN 130 may also include any combination of eNBs/gNBs/CBSDs and 4G/5G/nG mobile core network elements to facilitate UE 102 connecting to the enterprise SNPN 130 upon obtaining SNPN credentials from enterprise network 120 utilizing the techniques as presented herein.

In at least one embodiment, enterprise management system 121 may be inclusive of any hardware, software, logic, etc. for a network element that may facilitate the management/control/operation of enterprise network 120 and enterprise SNPN 130, including various operations as discussed herein. In at least one embodiment, enterprise management system 121 may be inclusive of an Enterprise Management Platform and may be implemented as a Cisco® Digital Network Architecture Center (DNA-C). In various embodiments, enterprise authentication server 123 may be inclusive of any hardware, software, logic, etc. that may provide any combination of Authentication, Authorization, and Accounting (AAA) services. In various embodiments, enterprise authentication server 123 may be implemented as any combination of an AAA server, a data network (DN) AAA (DN-AAA) server, or the like, and may facilitate any authentication and SNPN credential delivery services/operations as discussed herein.

In general, authentication services may include authenticating and/or authorizing one or more device(s) for one or more connections, for example, to enterprise network 120 and may be inclusive of any Authentication, Authorization, and Accounting (AAA) services that may be facilitated via any combination of authentication/authorization protocols such as Remote Authentication Dial-In User Service (RADIUS), DIAMETER, EAP [including any EAP variations], and/or the like. Generally, authentication refers to a process in which an entity's identity is authenticated, typically by providing evidence that it holds a specific digital identity such as an identifier/identity and corresponding credentials/authentication attributes/etc. Generally, authorization can be used to determine whether a particular entity is authorized to perform a given activity.

UE on-boarding is one of the enterprises challenges for enterprises managing private WWA access networks (e.g., 3GPP 4G/5G/nG networks), as may be provided via enterprise SNPN 130. There are currently no easy mechanisms for delivering network credentials (e.g., electronic SIM (eSIM) profile(s), or non-SIM credential(s)) to enterprise UE, which can make the on-boarding process a major hurdle to private 5G/nG adoption for enterprises. There is a need for simple, enterprise-friendly methods for network credential management that may not involve new elements in an enterprise network and/or a public mobile network service provider.

For example, the Global System for Mobile Communications Association (GSMA) defines a standards-based workflow for remote SIM or electronic SIM (eSIM) provisioning that is typically implemented in public mobile network operator (MNO) deployments that involves a Subscription Manager-Data Preparation (SM-DP) node that is utilized to deliver eSIM profiles to UEs over a standards-based SM-DP+interface. For the current standards-based workflow defined in GSMA's Remote SIM provisioning specifications, eSIM profiles are typically owned and managed by a Service Provider (SP). Thus, the currently defined GSMA workflow is public mobile network operator-centric in that a new device is typically manufactured with a pre-loaded bootstrapping profile that allows only a specific operator associated with that bootstrapping profile to add/delete new eSIM profiles onto an eUICC included in the device. Any time a new eSIM profile is to be downloaded to the device, the mobile user is expected to contact to the operator/SP and have the SP securely package the profile and deliver it to the device/eUICC over the SM-DP+interface. This approach of public mobile network operator-centric workflow is detrimental to deployment of private access networks, such as SNPN 130. Additionally, the standards-based workflow does not address aspects of provisioning non-SIM credentials for a UE.

Presented herein are techniques that provide an approach that the enterprise entity associated with enterprise network 120 can leverage for delivering SNPN credentials (e.g., SIM/non-SIM profiles/credentials) to a UE, such as UE 102, over an existing enterprise infrastructure and when connecting to the enterprise network 120 over a different radio access (e.g., when the UE connects to the enterprise network 120 via access network 110. This approach involves the UE 102 having some form of preconfigured/shared credentials for connecting to the enterprise network 120, but for a different access (e.g., enterprise Wi-Fi access credentials) than an access provided via enterprise SNPN 130.

Consider an operational example involving UE 102. The following operational example is discussed broadly with reference to FIG. 1, however, it is to be understood that additional operations can be performed via system 100, as discussed in further detail with reference to various example use cases and call flows discussed herein that may vary based on the type of access network 110 through which the UE 102 connects to enterprise network 120 to obtain SNPN credentials.

Broadly during operation, UE 102 is to perform/complete an EAP-based authentication through any of: directly connecting to an enterprise WLA access (e.g., an enterprise Wi-Fi access) operated by the enterprise entity associated with enterprise network 120, connecting to some Wi-Fi OpenRoaming™ HotSpot that is associated with the enterprise entity, or by connecting to a public 5G/nG network and triggering a 3GPP standards-defined EAP-based secondary authentication to enterprise authentication server 123.

For embodiments herein, UE 102, through completing the EAP-based authentication to the enterprise network 120 through any of these techniques, may obtain SNPN credentials associated with the enterprise private WWA (4G/5G/nG) access of enterprise SNPN 130. In one instance, the SNPN credentials may be delivered via an SNPN credentials object, which may include an eSIM profile or a non-SIM profile/credentials for the UE 102 and network identifier metadata, as discussed below, to enable the UE 102 to connect to the enterprise SNPN 130.

For example, when UE 102 the attaches to the enterprise network on a different access (e.g. Wi-Fi or Public 5G via access network 110) and performs an EAP-based authentication using the preconfigured/shared credentials associated with the other (SNPN) access, the enterprise network 120, via enterprise management system 121/SNPN credential manager logic 122 and enterprise authentication server 123, can deliver SNPN credentials associated with the enterprise SNPN 130 as part of the access authentication in which the SNPN credentials can enable the UE to connect to the enterprise SNPN 130.

The enterprise network 120, after validating the credentials of the UE as part of the UE's access authentication (over a different access) and by checking the device capabilities and an enterprise SNPN policy (via enterprise authentication server 123) can dynamically generate via enterprise management system 121/SNPN credential manager logic 122 a signed eSIM profile/non-SIM profile with corresponding credentials and network identifiers associated with the enterprise SNPN 130, which can enable the UE 102 to connect to enterprise SNPN 130.

For example, the enterprise authentication server 123, during an EAP authentication process with UE 102, may initiate creation of SNPN credentials [SIM profile or non-SIM credentials] via SNPN credential manager logic 122 of enterprise management system 121, as generally shown at 150 of FIG. 1. In various embodiments, the SNPN credential manager logic 122 may utilize one or more parameters, such as any combination of: Enterprise User Identity, private WWA network metadata/identifiers, location/location information for UE 102 and/or, optionally, Wi-Fi Service Set Identifier (SSID) (e.g., for an On-Premise use case).

The SNPN credential manager logic 122 may generate the SNPN credentials [eSIM profile|non-SIM credentials] (note, '|' and 'or' can be used interchangeably herein) along with network identifier metadata for UE 102 to enable UE 102 to connect to any of one or more access network(s) for enterprise SNPN 130. The network identifier metadata may include, but not limited to any combination of a Public Land Mobile Network (PLMN) identifier or identity (ID), Network Identifier (NID), Access Point Name (APN)/Data Network Name (DNN), operating frequency information, etc.

For example, an eSIM profile or package (e.g., characterized as one subtype of SNPN credential) may include IMSI, Integrated Circuit Card Identifier (ICCID) ICCID, security algorithms, authentication/security key(s), etc. along with network identifier metadata that may include PLMN ID, NID, APN/DNN, operating frequencies, etc. specific to a given location and SSID. In various embodiments, a generated eSIM profile may be formatted according to GSMA specifications and may include any combination of standards-defined and or enterprise-defined information. In another example, a non-SIM credentials package may include a Network Access Identifier (NAI) (e.g., 'user@enterprise.com'), password information, enterprise user ID, employee name, employee badge number, employee department/group/class/tier (management, Information Technology (IT), engineering, gold, bronze, Security Group Tag (SGT), etc.), enterprise locations (sites, facilities, floors, etc.), and/or the like. Broadly, any SNPN credentials, such as one or more eSIM profile(s) and/or non-SIM credentials, may be referred to herein as an electronic profile for a user/UE, such as user/UE 102.

In one example, separate eSIM profile metadata could be generated if the enterprise user is in an enterprise Germany Site (e.g., having different frequency bands, NID, and PLMN ID) as compared to a San Jose Site. Additionally, the APN/DNN mapped to the SSID may also be generated for the user/UE 102.

The SNPN credentials and associated network identifier metadata can be carried in an SNPN credentials object that may be signed by SNPN credential manager logic 122 and exchanged with enterprise authentication server 123, as generally shown at 151 of FIG. 1, to initiate credential provisioning for UE 102. The enterprise network 120, via enterprise authentication server 123, can deliver the signed SNPN credentials object to the UE 102 securely as an EAP payload in an EAP-REQUEST message that is set to a new type 'EAP-SNPN-CFG', includes a subtype indicator (e.g., an EAP extension such as a bit, byte, flag, Information Element (IE), Attribute Value Pair (AVP), attribute, etc.) set to SIM or non-SIM to indicate the type of credentials carried in the message, and also includes an operation indicator (e.g., an EAP extension such a bit, byte, flag, IE, AVP, attribute, etc.) set to 'Installation/Activation' to indicate that the SNPN credentials are to be installed and activated for UE 102 (e.g., operation type indicator set to Operation=Installation and Activation). As referred to herein, reference to generating a signed SNPN credentials object may be considered analogous to signing an eSIM profile or non-SIM credentials within an SNPN credentials object for various operations described herein.

For the credential provisioning, the EAP payload (SNPN credentials object) may be received by EAP supplicant logic 103 for UE 102, which delivers the SNPN credentials object to enterprise application logic 104. The enterprise application logic 104 may validate the integrity of the signed SNPN credentials object using a root certificate provisioned for the UE 102, interpret whether the credentials are SIM or non-SIM as per the subtype indication (SubType=SIM or NON-SIM), and, based on the operation indicator, determine that the credentials are to be installed and activated for UE 102.

In one instance, enterprise application logic 104 may be implemented as a Mobile Device Management (MDM) agent or client operating on the UE 102. In general, the term 'Mobile Device Management' or 'MDM' may refer to a management protocol that enterprise entity for enterprise network 120 may utilize to facilitate management of one or more enterprise devices (e.g., enterprise UE 102) through various MDM communications (e.g., MDM commands, requests, responses, etc.). In at least one embodiment, enterprise application logic 104 may be implemented as the Cisco® Meraki® Systems Manager or any other enterprise Connection Manager Application.

In various embodiments, the received SNPN credentials (e.g., eSIM profile or non-SIM credentials) may either be downloaded into eUICC 108 (e.g., SIM-based) or to a non-volatile memory such as memory/storage 106 (e.g., non-SIM) and can subsequently be used for network discovery of the enterprise SNPN 130 and for access authentication to connect to the enterprise SNPN 130. For example, eSIM profile 131 or non-SIM credentials 132 may enable UE 102 to connect to one or more private 3GPP WWA/4G/5G/nG/etc. access(es) of SNPN 130.

For example, for a SIM case, the enterprise application logic 104 may be inclusive of any hardware, software, logic, etc. that may perform a function call via an eUICC manager logic 107 Application Programming Interface (API), which may be exposed by eSIM management logic/functions (e.g. a Local Profile Assistant (LPA) and/or the like) for eUICC manager logic 107, that enable translation and installation of one or more eSIM profile(s) (e.g., eSIM profile 131) into the eUICC chip 108 for the UE 102 and/or disabling/deleting of one or more eSIM profile(s) for the eUICC chip 108.

The eUICC manager logic 107 may be inclusive of any hardware, software, logic, etc. that interfaces with eUICC chip 108 via any combination of GSMA-defined ES10 interfaces, such as ES10a, ES10b, and ES10c interfaces, referred to collectively as the 'ES10x' interface in order to facilitate installing, activating, disabling, and/or deleting one or more eSIM profiles for the eUICC chip 108. The eUICC chip 144 may be inclusive of any systems, functions, etc. involving any combination hardware, software, logic, etc. that may facilitate installing, activating, disabling, and/or deleting one or more eSIM profiles for enterprise UE 102. Although not illustrated in FIG. 1, eUICC 108 may include a eUICC controller and a eUICC card controller.

For a non-SIM case, the enterprise application logic 104 may perform a function call provided via non-SIM credentials manager logic 105 on the UE 102 to install the non-SIM credentials in memory/storage 106. Non-SIM credentials manager logic 107 may be inclusive of any hardware, software, logic, etc. that may facilitate installing, activating, disabling, and/or deleting one or more non-SIM credential(s) for UE 102.

Upon successful provisioning of the SNPN credentials (eSIM profile or non-SIM credentials) for UE 102, the enterprise application logic 104 may generate a signed key for the installed credentials (SIM non-SIM) and may provide it to the EAP supplicant logic 103 to be communicated back to enterprise authentication server 123 via an EAP-SUCCESS message.

In addition to installing/activating credentials for UE 102, techniques herein may also facilitate life-cycle management operations via EAP extensions that may provide for the ability to delete or disable various credentials for UE 102. Thus, techniques presented herein may address the problems of SNPN credential provisioning and life-cycle management by extending the EAP protocol in order to facilitate delivering SNPN credentials from an enterprise authentication server to a UE over EAP via an SNPN credential provisioning/delivery service and to facilitate SNPN credential management services.

Various example details are now provided with reference to various example use cases. In particular, a first example use case is an enterprise WLA On-premise use case 200 discussed with reference to FIGS. 2, 3A, 3B, and 3C in which the access network/infrastructure 110/111 is an enterprise WLA (e.g., Wi-Fi) infrastructure 110a/111a to which UE 102 connects to obtain SNPN credentials from enterprise network 120. A second example use case is an OpenRoaming Off-premise use case 400 discussed with reference to FIGS. 4, 5A and 5B in which the access network/infrastructure 110/111 is an OpenRoaming WLA access network/infrastructure 110b/111b to which UE 102 connects to obtain SNPN credentials from enterprise network 120. A third example use case is a public 5G MNO Off-premise use case 600 discussed with reference to FIGS. 6, 7A and 7B in which the access network/infrastructure 110/111 to which UE 102 connects is a public MNO WWA access network/infrastructure 110c/111c to obtain SNPN credentials from enterprise network 120.

Figure 2:
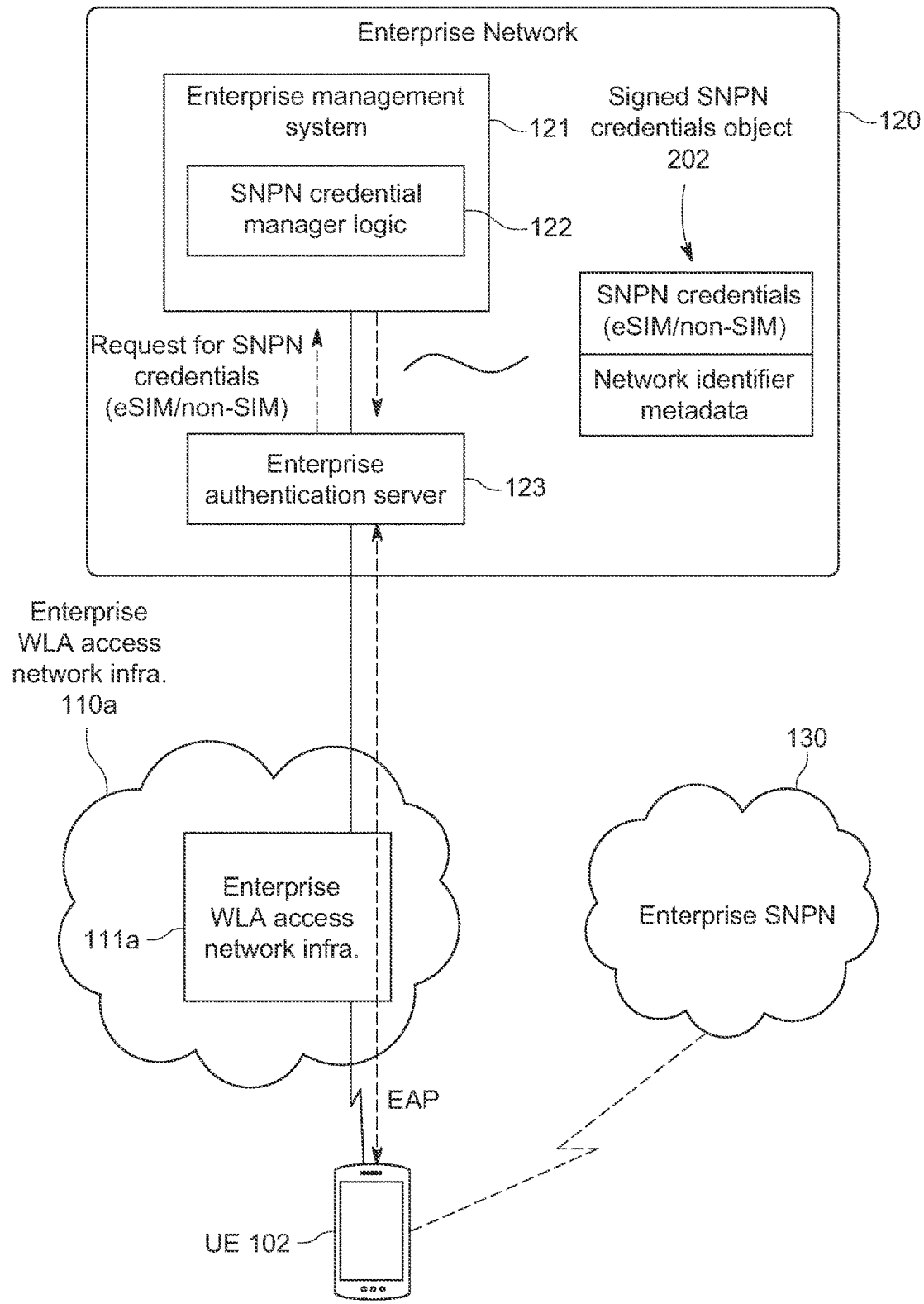
FIG. 2 is a diagram illustrating example details associated with a first example use case involving delivering SNPN credentials from an enterprise authentication server to a UE over EAP, according to an example embodiment.

Turning to FIG. 2, the enterprise WLA On-premise use case 200 includes UE 102, enterprise network 120 including enterprise management system 121/SNPN credential manager logic 122 and enterprise authentication server 123. Enterprise SNPN 130 is also shown in FIG. 2.

For the enterprise WLA (Wi-Fi) On-premise use case 200, consider that access network/infrastructure 110/111 is configured as an enterprise WLA access network/infrastructure 110a/111a (e.g., including enterprise WLA APs, WLC, etc.). Further for the enterprise WLA On-premise use case 200, consider that enterprise authentication server 123 may be configured as an AAA server for the enterprise network 120.

Figure 4:
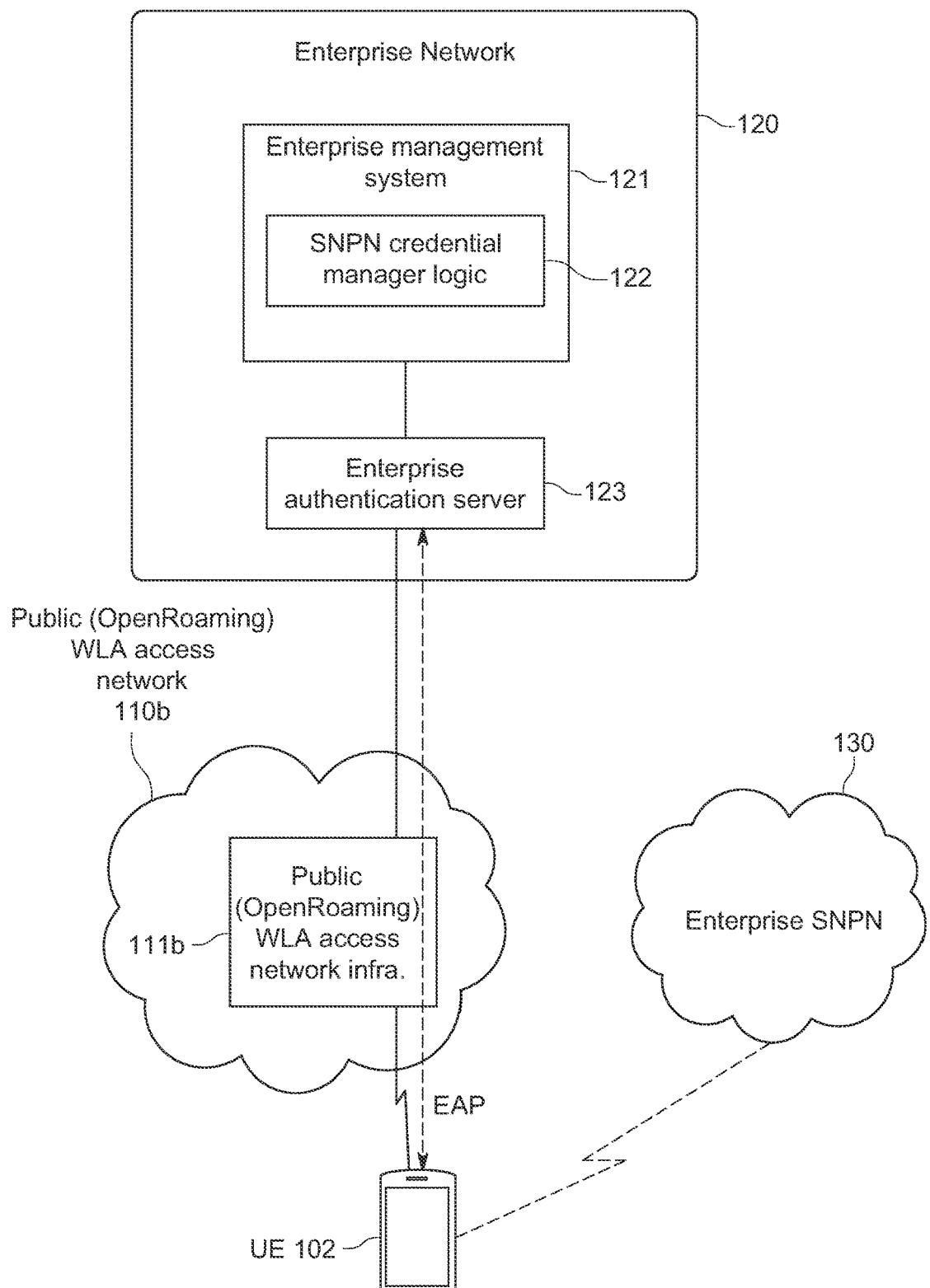
FIG. 4 is a diagram illustrating example details associated with a second example use case involving delivering SNPN credentials from an enterprise authentication server to a UE over EAP, according to an example embodiment.
Figure 6:
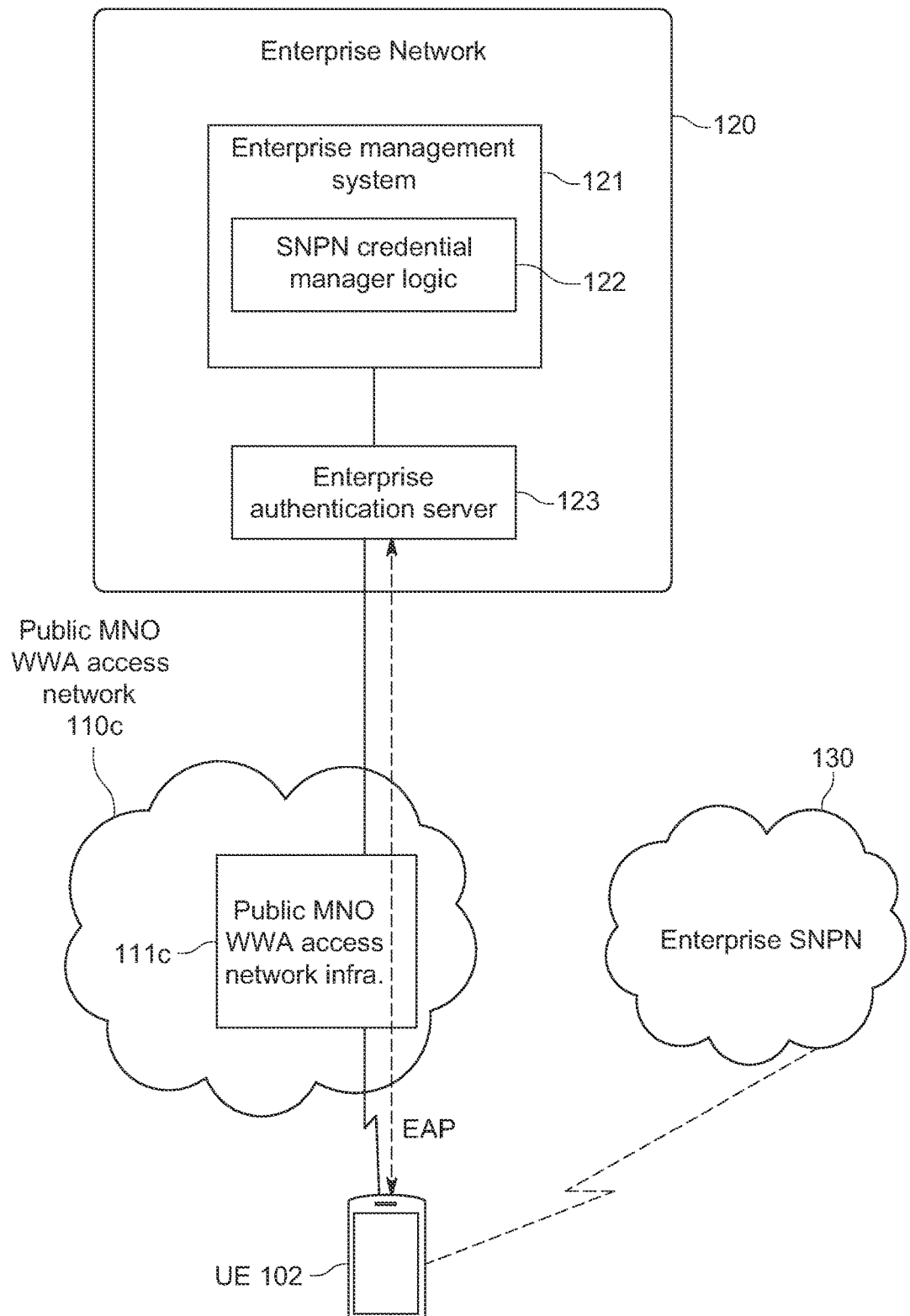
FIG. 6 is a diagram illustrating example details associated with a third example use case involving delivering SNPN credentials from an enterprise authentication server to a UE over EAP, according to an example embodiment.

For the enterprise WLA On-premise use case 200, the EAP SNPN credential provisioning technique may be initiated after a secure dot1x connection is established between an EAP-peer (e.g., UE 102) and an EAP-server (e.g., enterprise authentication server 123), however, the techniques as described herein for extending EAP are not limited to WLA/Wi-Fi access, but may also be broadly applicable to any access authentication where an EAP framework is used, for example, as illustrated with reference to the second and third example use cases (e.g., FIGS. 4 and 6). It is to be understood that techniques herein involving information exchanged between EAP peers can be used with any EAP methods now known or hereafter developed (e.g., the EAP authentication framework as prescribed by Internet Engineering Task Force (IETF) Request For Comments (RFC) 3748/5247, EAP Authentication and Key Agreement (EAP-AKA) as prescribed at least by RFC 4187, improved EAP-AKA (EAP-AKA') as prescribed at least by RFC 5448, EAP Transport Layer Security (EAP-TLS) as prescribed at least by RFC 5216, EAP Tunneled TLS (EAP-TTLS) as prescribed at least by RFC 5281, etc.). Additionally, embodiments herein are not limited to an EAP framework and can be extended and/or otherwise enhanced/integrated into non-EAP based authentication protocols, such as Evolved Packet System (EPS) AKA (EPS-AKA) in which information/elements can be carried over the 3GPP Non-Access Stratum (NAS) protocol. Other authentication protocols can be envisioned.

Figure 3A:
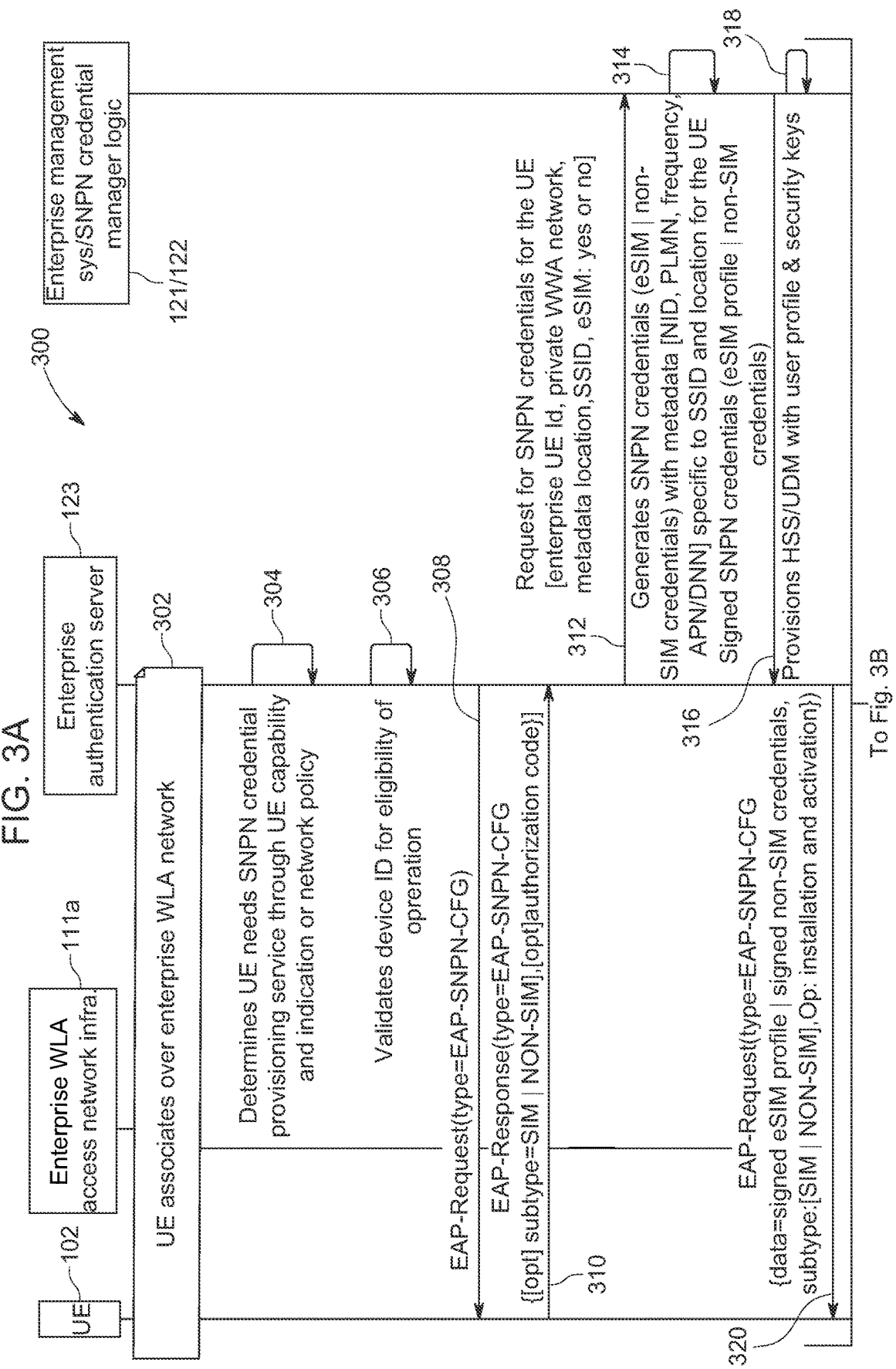
FIGS. 3A, 3B, and 3C are a message sequence diagram illustrating a call flow associated with delivering SNPN credentials to a UE over EAP according to the first example use case illustrated in FIG. 2, according to an example embodiment.
Figure 3B:
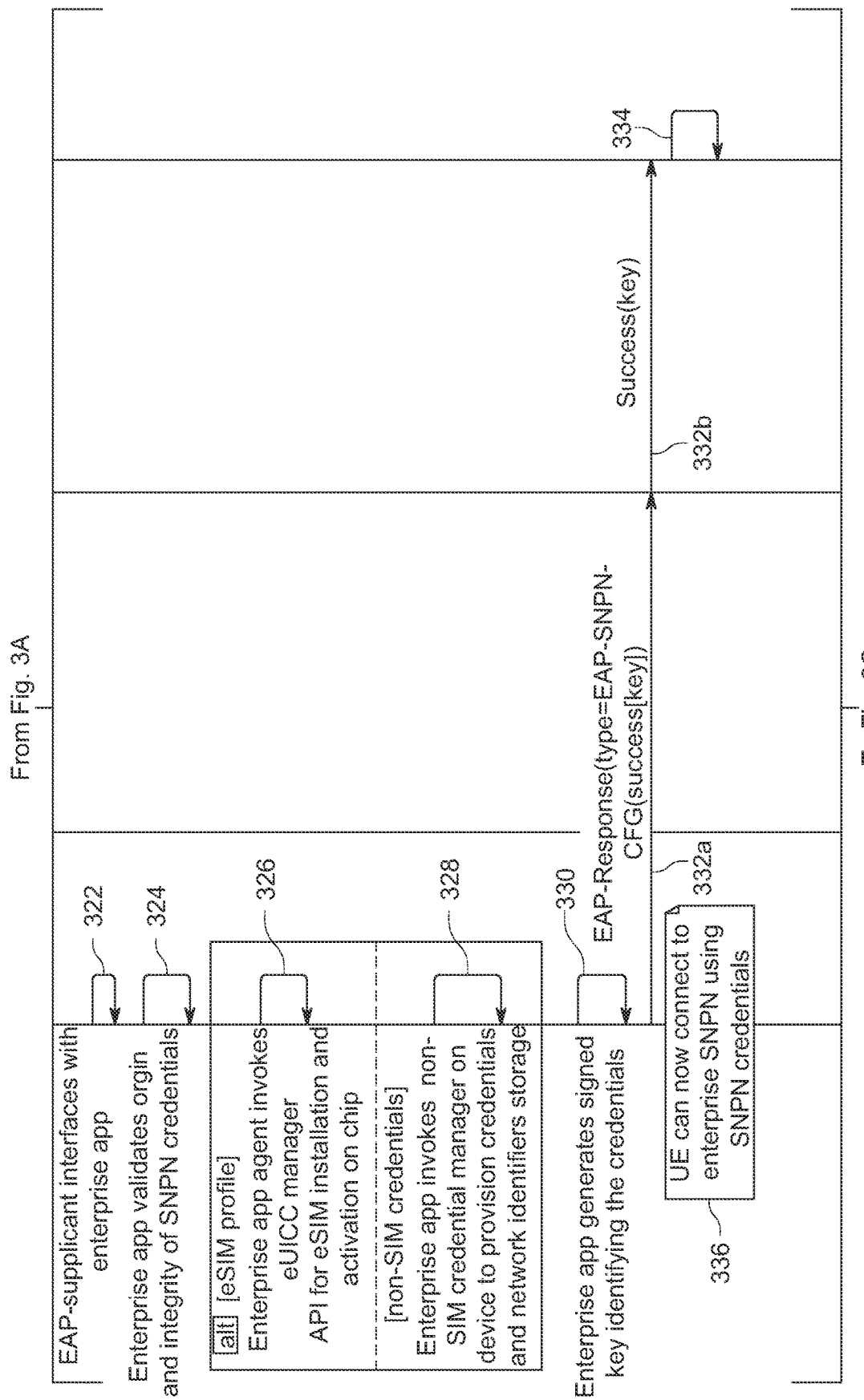
Figure 3C:
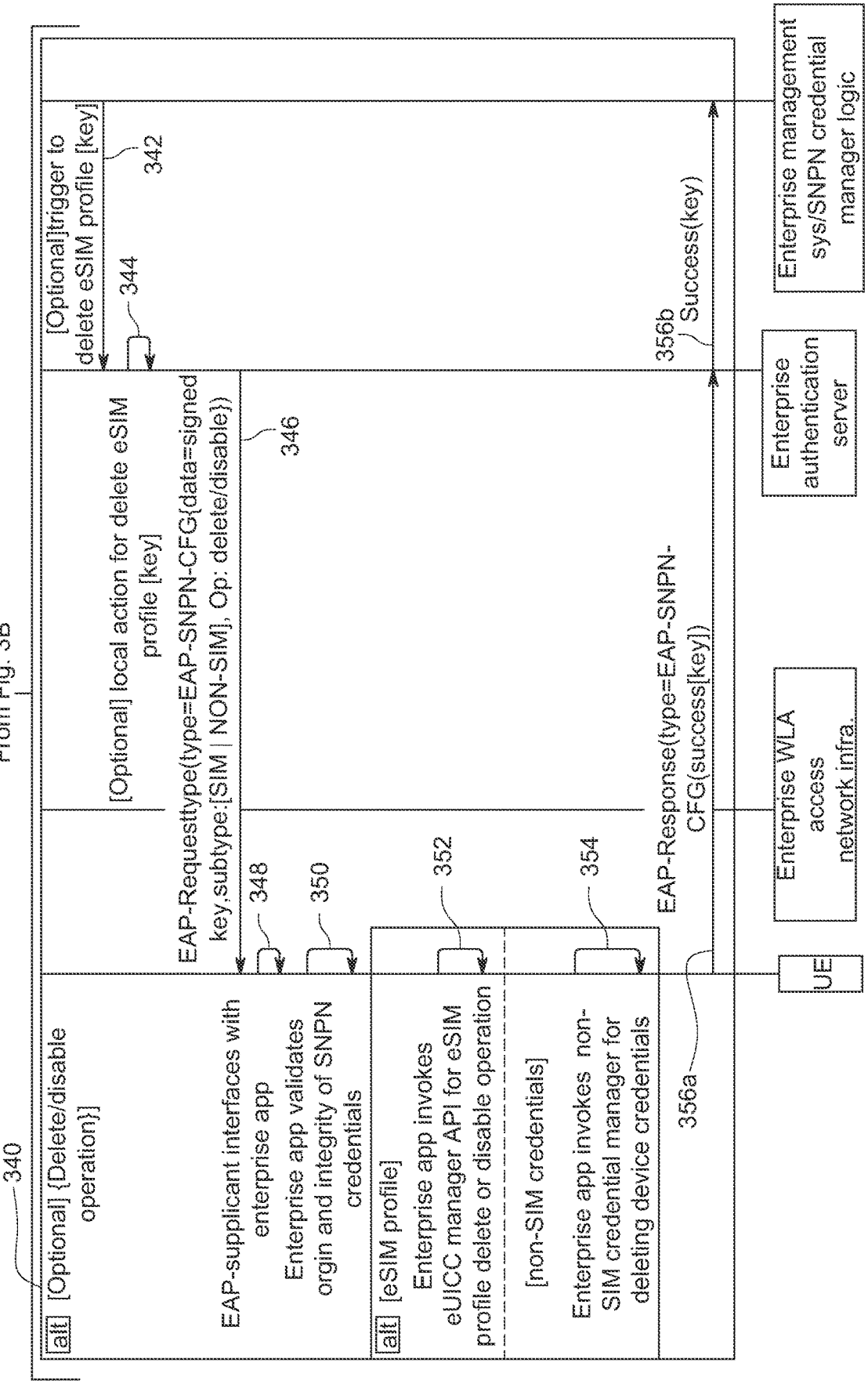

Consider various example operational details for the enterprise WLA On-premise use case 200 as discussed with reference to FIGS. 3A, 3B, and 3C, which are a message sequence diagram illustrating a call flow 300 associated with delivering SNPN credentials to a UE over EAP for to the enterprise WLA On-premise use case 200, according to an example embodiment. FIGS. 3A, 3B, and 3C include UE 102, enterprise WLA access network infrastructure 111a, enterprise authentication server 123, and enterprise management system/SNPN credentials manager logic 121/122.

For call flow 300, consider at 302 that UE 102 is configured with valid dotlx credentials to perform an association over the enterprise WLA access network 110a/enterprise WLA access network infrastructure 111a and establish a dotlx connection with enterprise authentication server 123. Further for call flow 300, consider that UE 102 and SNPN credential manager logic 122 are provisioned and/or otherwise configured with a digital certificate, sometimes referred to as a root certificate authority (CA) chain or root certificate that enables signing various information, as discussed in further detail herein. Each of UE 102 and SNPN credential manager logic 122 may also be provisioned with a respective private key to facilitate operations as discussed herein. In at least one embodiment, a digital certificate may have a format as prescribed by the X.509 public key infrastructure (PKI) standard as defined at least by Internet Engineering Task Force (IETF) Request For Comments (RFC) 5280, however, other certificates may be utilized in accordance with techniques herein. Among other information, a root certificate typically includes a public key that can be utilized by certificate holders to decrypt signed/encrypted information. Generally, to secure or encrypt information that is to be sent from one certificate holder to another certificate holder, a first entity can sign information with its private key and a hash algorithm (e.g., Secure Hash Algorithm 256 (SHA256), etc.) in order to create signed/encrypted information. A second entity can then decrypt the signed information using the public key contained in the digital certificate to obtain the original (unsigned/decrypted) information.

Returning to FIG. 3A, as the UE 102 (e.g., a Wi-Fi client) has valid dotlx credentials associated with the SSID for enterprise WLA access network 110a, UE 102 may proceed to automatically associate and complete 802.1x authentication with the enterprise authentication server 123, as shown at 302, and the enterprise authentication server determines, at 304, that UE 102 is to receive the SNPN credential provisioning service through any combination of a UE 102 capability and/or indication and/or an enterprise network policy obtained by the enterprise authentication server 123. Additional determinations that the UE 102 is to receive the SNPN credential provisioning service can also be based on various validations, as discussed at 306, below.

For example, in one embodiment for the UE 102 association at 302, the UE 102 could request to the enterprise authentication server 123 that it needs WWA/5G SNPN credentials mapped to a WLA SSID for enterprise WLA access network 110a and specific to a given location (e.g., a particular enterprise campus, site, building, etc.). In one embodiment, for example, a user for UE 102 (user/UE 102) could trigger the request through clicking a check box in an SSID profile section of UE 102, thereby resulting in a new Information Element (IE) as part of an 802.11 Association request (302) or through a new AVP object in EAP signaling to the enterprise authentication server 123 during EAP authentication. The EAP signaling option may also be useful to facilitate SNPN credential management services (SNPN credential delivery and life-cycle management services) for a UE even when a UE may not be within enterprise premises (e.g., using OpenRoaming services from any WLA HotSpot or using secondary authentication to an enterprise authentication over EAP from a WWA/5G public MNO network, as discussed for other example use cases herein).

In another variation, the credential provisioning/management services for a UE could be enabled dynamically by the enterprise network 120 on detecting that the device is WWA (4G/5G/nG) capable with support of eSIM and/or non-SIM credentials. In various embodiments, the WWA capability of a UE/device could be based on any combination of: device brand/eco-system analytics (e.g., based on device manufacturer, etc.); through use of an enterprise inventory that has device capabilities for each of an enterprise device (enterprise UE 102) identifier; and/or the like. In some embodiments, for example, enterprise authentication server 123 may interface with an Equipment Identity Register (EIR) or other database for enterprise network to determine any device identity/capability/policy for one or more enterprise UEs.

Continuing to 306, the determining by the enterprise authentication server 123 that the UE is to receive the SNPN credential provisioning service further includes validating the UE 102/device ID for eligibility of operation for the SNPN provisioning service (e.g., based on comparing UE/device ID to one or more enterprise policies, etc.). In various embodiments, a UE/device ID may include any combination of: an International Mobile Equipment Identifier (IMEI), an ICCID, a Universally Unique Identifier (UUID), Permanent Equipment Identifier (PEI), Subscription Permanent Identifier (SUPI), and/or the like.

After successful dotlx authentication over the enterprise WLA access network/infrastructure 110a/111a, the enterprise authentication server 123 initiates an SNPN credential management procedure by performing an authentication (e.g., EAP) process with UE 102 through sending the UE 102 an EAP-REQUEST message that includes an EAP type indicator set to the new type 'EAP-SNPN-CFG' (Type=EAP-SNPN-CFG) indicating an EAP SNPN configuration/provisioning message, as shown at 308.

At 310, the UE 102 replies with an EAP-RESPONSE message set to the new type (Type=EAP-SNPN-CFG). In at least one embodiment, the UE 102 may optionally include an indication of whether the UE 102 is requesting eSIM or non-SIM credentials by including a SIM or non-SIM subtype indicator (SubType=SIM|NON-SIM) in the message at 310. In at least one embodiment, the UE 102 may include an authorization code in the message at 310. In various embodiments, the authorization code could be delivered to the UE 102 through any out-of-band (OOB) mechanism, such as email, Short Message Service (SMS) etc. For embodiments in which an authorization code may be incorporated into SNPN provisioning/management services an OOB authorization layer may be added to the process in order to validate/authorize the UE and send the UE an authorization code or code(s) (e.g., different codes could be utilized to authorize the services for the UE at different locations, etc.).

Upon obtaining the message from UE 102, the enterprise authentication server, at 312, initiates creation/generation of the SNPN credentials [eSIM profile|non-SIM credentials] for UE 102 from the SNPN credential manager logic 122 operating via the enterprise management system 121/cloud. For example, as shown at 312, the enterprise authentication server 123 sends a request to the SNPN credential manager logic 122 that includes the enterprise user/UE 102 ID, private network metadata/identifier(s) (e.g., any combination of PLMN ID, NID, APN/DNN, frequency information, etc.)) for enterprise SNPN 130, location information for UE 102, the SSID for enterprise WLA access network 110a and an indication of whether the SNPN credentials to be generated are to be eSIM credentials (yes or no) in which an indication of 'no' indicates that the SNPN credentials are to be non-SIM credentials. Location information for a UE can be any location information that may be reported by network elements. For example, if the network element to which a UE is attached is in "San Jose" (California) this location information can be included in the request sent to the SNPN credential manager logic 122 so that generated SNPN credentials can be specific to that location/region. Other examples may include Global Positioning System (GPS) coordinates, 3GPP location identifiers (e.g., Tracking Area Identity (TAI), Location Area Identity (LAI), etc.), RAN identifiers, and/or the like.

At 314, the SNPN credential manager logic 122 generates the SNPN credentials (e.g., eSIM profile or non-SIM credentials) to enable UE 102 to connect to the enterprise SNPN 130. The SNPN credentials manager logic 122 utilizes the parameters (enterprise user/UE 102 ID, private WWA (4G/5G/nG) network identifiers, the location information for UE 102 and the SSID, to generate the SNPN credentials [eSIM profile|non-SIM credentials] along with network identifier metadata (e.g., PLMN, NID, APN/DNN, etc.) specific to the given UE 102 location and the SSID. The generated SNPN credentials and network identifier metadata may be encapsulated in an SNPN credentials object.

At 316, the enterprise management system 121/SNPN credential management logic 122 signs the SNPN credentials object that includes [eSIM profile or non-SIM credentials] and the network identifier metadata and sends the signed SNPN credentials object (generally shown as 202, in FIG. 2) to the enterprise authentication server 123 to begin the provisioning. Additionally, as shown at 318, the enterprise management system 121/SNPN credential management logic 122 provisions an HSS (4G/LTE) and/or UDM (5G/nG) for the corresponding 4G/5G/nG access networks of enterprise SNPN 130 with the user profile and authentication material/security keys for UE 102, which enables the UE 102 to connect to the enterprise SNPN 130 utilizing 3GPP standards-based operations.

For the SNPN credential provisioning for UE 102, the enterprise authentication server 123 sends the signed SNPN credentials object (202) to UE 102, as shown at 320, in an EAP-REQUEST message with various information/indications including but not limited to: Type=EAP–SNPN–CFG, SubType=SIM or Non-SIM (credential type indicator set depending on the type of credentials), Signed data=signed SNPN credentials object [e.g., signed eSIM profile or signed non-SIM credentials], and an operation type indicator, such as Operation=Installation and Activation.

For UE 102, the signed SNPN credentials object and subtype of the credentials (SIM or non-SIM) are delivered to the EAP supplicant logic 103, which delivers the signed SNPN credentials object (202) to the enterprise application logic 104 (e.g., which could be an MDM agent operating on the UE), as shown at 322. At 324, the enterprise application logic 104 validates the integrity of the signed SNPN credentials object (202) and interprets the object as an SIM credentials (e.g., an eSIM profile) or non-SIM credentials as per the SubType indication. In one example, the validation may include decrypting the signed SNPN credentials object using the public key contained in the digital certificate to obtain the (unsigned/unencrypted) SNPN credentials (eSIM profile or non-SIM credentials) and network identifier metadata contained in the signed SNPN credentials object.

Various operations may be performed by UE 102 to provision the SNPN credentials based on whether the SNPN credentials are SIM-based credentials or non-SIM-based credentials, as indicated by the subtype indicator.

For embodiments in which the credentials are SIM-based credentials including an eSIM profile for UE 102, as shown at 326, the enterprise application logic 104 may perform a function call via an eUICC Manager API exposed by eSIM management logic/functions (e.g. an LPA and/or the like) for eUICC manager logic 107, which enables translation of the eSIM profile and installation/activation of the eSIM profile into the eUICC chip 108 for the enterprise UE. It should be noted this is realizable today in both Android® and Apple® products using a carrier application. Similar behavior can be extended to enterprise application logic 104 or MDM logic, which may have similar entitlement. Android® is a registered trademark of Google LLC. Apple® is a registered trademark of Apple Inc.

For embodiments in which the SNPN credentials are non-SIM-based credentials including non-SIM credentials for UE 102, as shown at 328, the enterprise application logic 104 may perform a function call via non-SIM credentials manager logic 105, which installs/provisions the non-SIM credentials the network identifiers in UE 102 memory/storage 106.

Upon installation of the SNPN credentials using the appropriate mechanisms/logic, the enterprise application logic 104 generates a signed key that identifies installed credentials (SIM NON-SIM) for UE 102, as shown at 330, indicating successful provisioning/installation/activation of the credentials and provides the signed key to the EAP supplicant logic 103, which sends the signed key to the enterprise authentication server 123 via in EAP-SUCCESS message, as shown at 332a. In various embodiments, a signed key may be any multi-bit value, identifier, etc. that can be used to identify installed credentials for SIM and/or non-SIM identities. The operations at 330 can include the enterprise application logic 104 generating the (unsigned) key and mapping/associating/storing the key to an eSIM profile ID or non-SIM credentials ID (depending on the type of credentials), which may enable identification of the corresponding credentials for various SNPN credentials life-cycle management operations that may be performed, as discussed in further detail below.

The enterprise authentication server 123 can store the signed key in correlation/association to other user/UE 102 information maintained by the server. At 332b, the enterprise authentication server 123, forwards the signed key to the enterprise management system 121/SNPN credential manager logic 122, which validates (e.g., decrypts) and stores the key identifying the SNPN credentials, as shown at 334.

As shown at 336, following the provisioning/installation/activation of the SNPN credentials, UE 102 can now connect to the enterprise SNPN 130 using the provisioned SNPN credentials.

In addition to delivery/provisioning of SNPN credentials discussed above, techniques herein may additionally facilitate life-cycle management operations 340 of SNPN credentials for UE 102, as shown in FIG. 3C, in which the enterprise network 120 may initiate the deletion or disablement of SNPN credential(s) on an enterprise device (UE 102) through various options.

In one embodiment, as shown at 342, the SNPN credential manager logic 122 via the enterprise management system 121/cloud may initiate a delete/disablement procedure by providing (potentially re-signing) the signed key for particular SNPN credentials to the enterprise authentication server 123 along with an indication that the corresponding credentials are to be deleted/disabled. In another embodiment, the enterprise authentication server 123 may take local action to delete/disable a particular credential identified by a corresponding signed key stored by the enterprise authentication server 123 for user/UE 102, as shown at 344.

For either embodiment 342/344, the enterprise authentication server 123 may initiate a Delete or Disable procedure of corresponding SNPN credentials by sending to UE 102 an EAP-REQUEST message including, but not limited to: Type=EAP-SNPN-CFG, SubType=SIM or Non-SIM (depending on the type of credentials), Signed data=signed key of SNPN credentials, and optionally, an operation type indicator, such as Operation=Delete or Disable, as shown at 346.

As shown at 348, the signed key of the SNPN credentials to be deleted/disabled and the subtype of credentials (SIM or NON-SIM) are delivered to the EAP supplicant logic 103, which delivers the same to the enterprise application logic 104. At 350, the enterprise application logic 104 validates the origin and integrity of the signed key (e.g., using operations as discussed above at 324).

Various operations may be performed by UE 102 to delete/disable the SNPN credentials based on whether the SNPN credentials are SIM-based credentials or non-SIM-based credentials, as indicated by the subtype indicator.

For embodiments in which the credentials are SIM-based credentials including an eSIM profile for UE 102, the enterprise application logic 104 can perform a function call to the eUICC Manager API enabling deletion or disabling of the eSIM profile identified by the key (mapped to the eSIM profile ID) in the eUICC chip 108, as shown at 352.

For embodiments in which the credentials are non-SIM based credentials, the enterprise application logic 104 performs a function call to the non-SIM credentials manager logic 105 to delete the credentials from memory/storage 106, as shown at 354.

Upon successful deletion or disabling of the credentials, the enterprise application logic sends a success indication to the EAP supplicant logic 103 including the signed key, which sends the signed key back to the enterprise authentication server 123 at 356a. As shown at 356b, the enterprise authentication server 123 can forward the success indication including the signed key to enterprise management system 121/SNPN credential manager logic 122, to complete the procedure.

Thus, techniques presented herein may address the problems of SNPN credential provisioning and life-cycle management by extending the EAP protocol in order to facilitate delivering SNPN credentials from an enterprise authentication server to a UE over EAP via an SNPN credential provisioning/delivery service and to facilitate SNPN credential management services when a UE attaches and completes access authentication to an enterprise campus WLA (Wi-Fi) network and obtains SNPN credentials from enterprise management system 121/SNPN credential manager logic 122, which may be in an enterprise cloud.

Referring to FIG. 4, FIG. 4 is a diagram illustrating example details associated with the second example use case, which is an OpenRoaming WLA Off-premise use case 400 involving UE 102, enterprise network 120 including enterprise authentication server 123 and enterprise management system 121/SNPN credential management logic 122 in which the access network/infrastructure 110/111 is configured as a public (OpenRoaming) WLA access network/infrastructure 110b/111b (e.g., including WLA APs/HotSpots, WLCs, etc.) configured according to OpenRoaming Consortium standards such that it is part of the Consortium and an RCOI is configured for the public (OpenRoaming) WLA access network/infrastructure 110b/111b (generally, a visited network). For the OpenRoaming WLA Off-premise use case 400, consider that the enterprise entity associated with enterprise network 120 is part of the OpenRoaming Consortium (e.g., is an identity provider that is part the OpenRoaming identity federation) and that enterprise authentication server 123 may be configured as a home AAA server. Further, consider that UE 102 and enterprise management system 121/SNPN credential manager logic 122 may be provisioned with keys/certificates as discussed above for FIGS. 2 and 3A-3C.

Generally, the OpenRoaming WLA Off-premise use case 400 illustrates that UE 102 can attach to an OpenRoaming HotSpot for the public (OpenRoaming) WWA access network/infrastructure 110b/111b and complete an authentication (e.g., a secondary authentication) to enterprise authentication server 123 (e.g., a home AAA server) for a Protocol Data Unit Session (PDU) session in order to obtain SNPN credentials from enterprise network 120. Various example operational details for the OpenRoaming WLA Off-premise use case 400 are illustrated with reference to FIGS. 5A and 5B, which are a message sequence diagram illustrating a call flow 500 associated with delivering SNPN credentials to UE 102 over EAP according to the OpenRoaming WLA Off-premise use case 400.

Figure 5B:
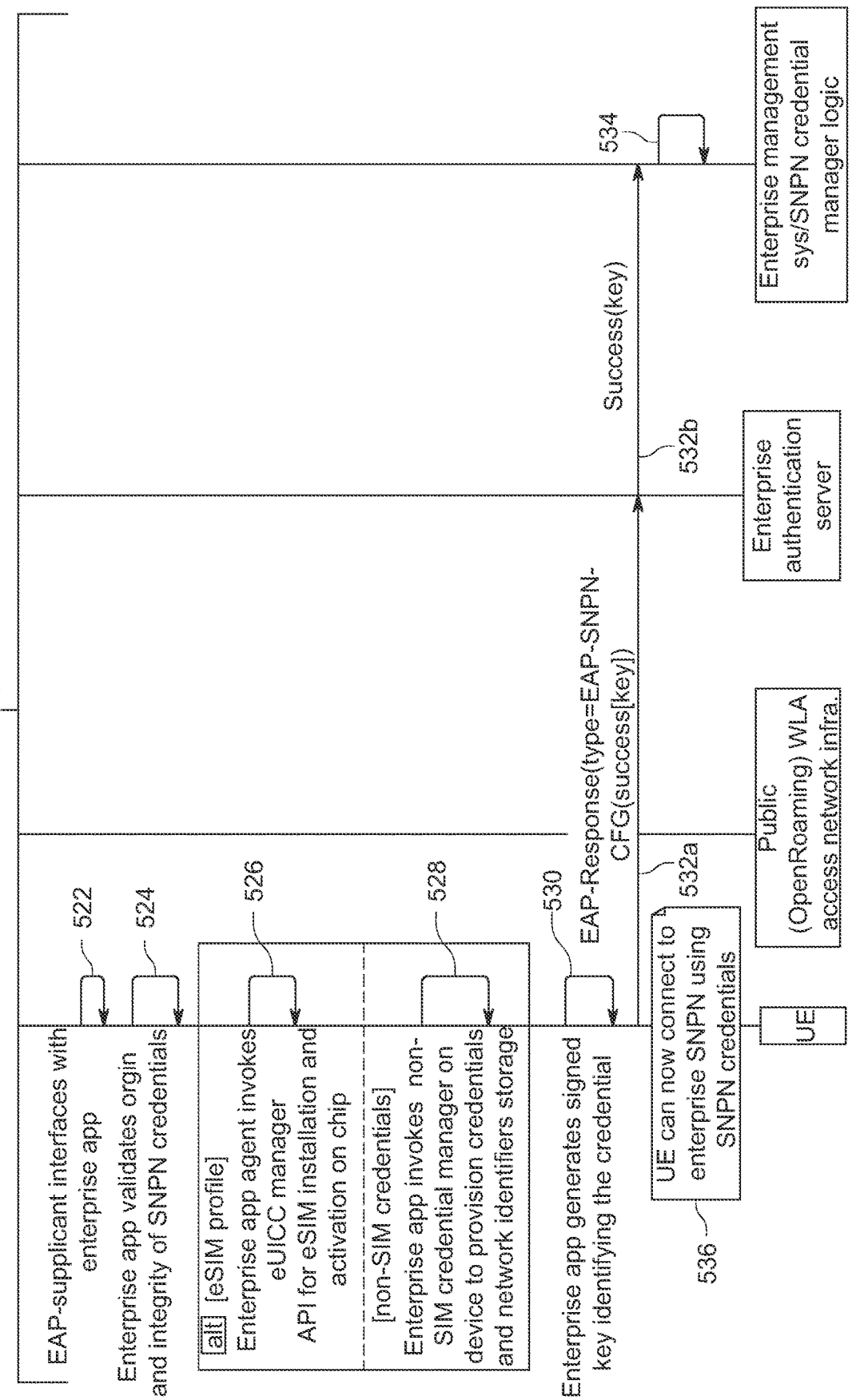

The operations for FIGS. 5A and 5B are similar to those discussed and illustrated above with regard to FIGS. 3A and 3B, except that the UE 102 association at 502 and the enterprise authentication server 123 validation at 506a for FIG. 5A are performed with reference to the RCOI configured for the public (OpenRoaming) WLA access network/infrastructure 110b/111b.

For example, at 506a, the determining by the enterprise authentication server 123 (e.g., home AAA) that the UE 102 is to receive the SNPN credential provisioning service further includes validating whether the public (OpenRoaming) WLA access network/infrastructure 110b/111b, as identified from the RCOI (and potentially access network location), is/are in a whitelist or a blacklist to utilize the SNPN credential management/provisioning services along with the validation at 506b for validating the eligibility of UE 102 to participate in the SNPN credential management services/procedures. Note, the determination operations performed by enterprise authentication server 123 at 504 may be performed the same as discussed above at 304 of FIG. 3A.

Upon the enterprise authentication server 123 validating the RCOI/location for the public (OpenRoaming) WLA access network/infrastructure 110b/111b at 506a and validating the eligibility of UE 102 at 506b to participate in the SNPN credential management services/procedures, the remaining operations for FIGS. 5A and 5B as shown at 508, 510, 512, 514, 516, 518, 520, 522, 524, 526, 528, 530, 532a, 532b, 534, and 536 may be performed as discussed above for analogous operations 308, 310, 312, 314, 316, 318, 320, 322, 324, 326, 328, 330, 332a, 332b, 334, and 336 illustrated for FIGS. 3A and 3B. Although not illustrated, it is to be understood that life-cycle management operations may also be performed for the OpenRoaming WLA Off-premise use case 400 similar to those discussed above for FIG. 3C.

Referring to FIG. 6, FIG. 6 is a diagram illustrating example details associated with the third example use case, which is a public MNO WWA Off-premise use case 600 involving UE 102, enterprise network 120 including enterprise authentication server 123 and enterprise management system 121/SNPN credential management logic 122 in which the access network/infrastructure 110/111 is configured as a public WWA access network/infrastructure 110c/

111c (e.g., including 3GPP eNBs/gNBs and a 3GPP mobile core network) operated by a public MNO and configured according to 3GPP standards. For the public MNO WWA Off-premise use case 600, consider that enterprise authentication server 123 may be configured as a DN-AAA server. Further, consider that UE 102 and enterprise management system 121/SNPN credential manager logic 122 may be provisioned with keys/certificates as discussed above for FIGS. 2 and 3A-3C.

Generally, the public MNO WWA Off-premise use case 600 illustrates that UE 102 can attach to the public MNO WWA access network/infrastructure 110c/111c and complete an authentication (e.g., a secondary authentication) to enterprise authentication server 123 (e.g., a DN-AAA server) for a Protocol Data Unit Session (PDU) session in order to obtain SNPN credentials from enterprise network 120. Various example operational details for the public MNO WWA Off-premise use case 600 are illustrated with reference to FIGS. 7A and 7B, which are a message sequence diagram illustrating a call flow 700 associated with delivering SNPN credentials to UE 102 over EAP according to the public MNO WWA Off-premise use case 600.

Figure 7B:
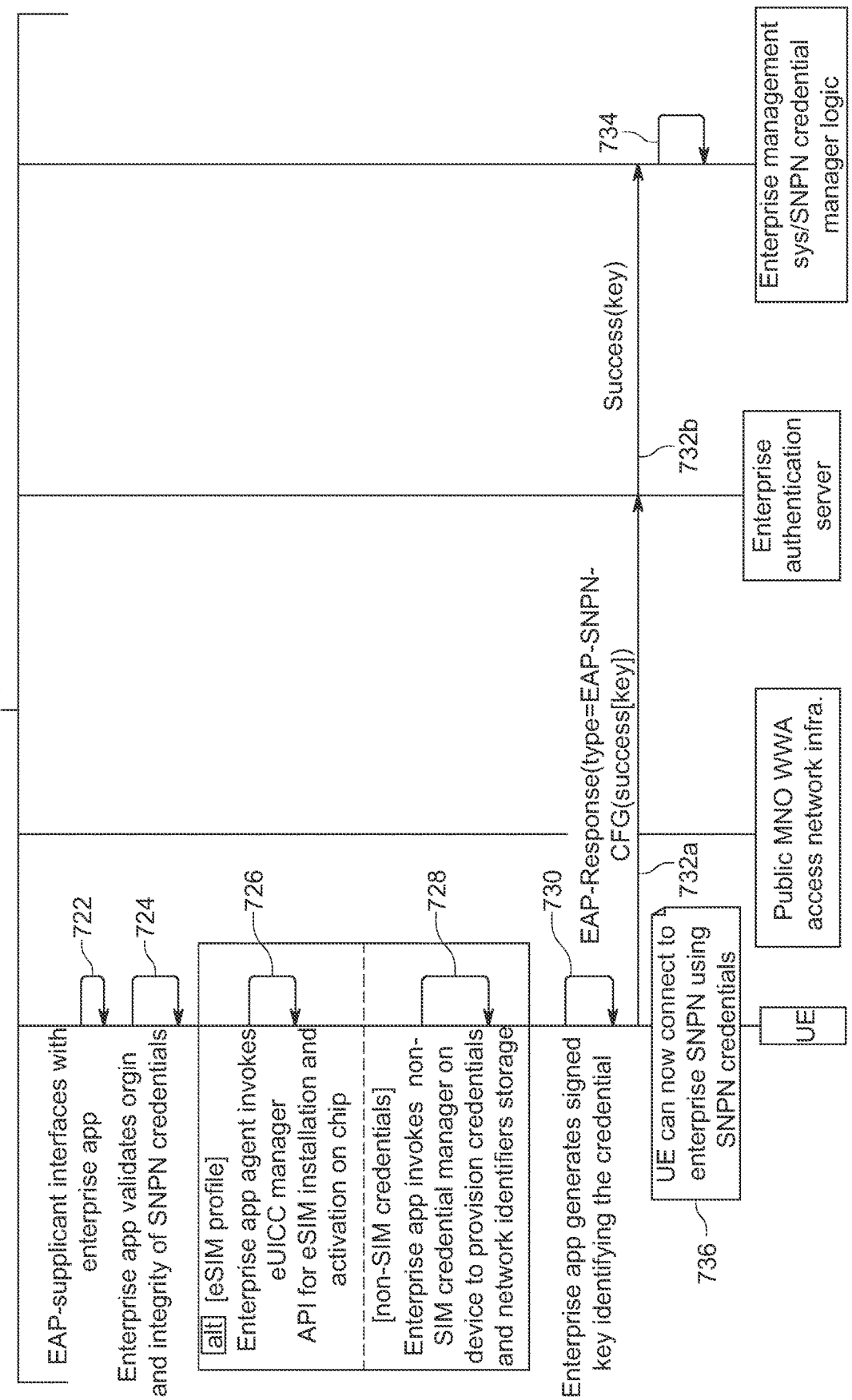

The operations for FIGS. 7A and 7B are similar to those discussed and illustrated above with regard to FIGS. 3A and 3B, except that, at 702a, the UE 102 registers with the public MNO WWA access network/infrastructure 110c/111c, which determines at 702b that the UE 102 is to complete a secondary authentication with the enterprise authentication server 123. In one embodiment, the determination at 702b may be based on subscription information for UE 102 maintained and/or otherwise obtained by the public MNO WWA access network/infrastructure 110c/111c from UE 102 subscription information and/or from UE 102 itself via the WWA registration at 702a.

Based on the determination at 702b, the public MNO WWA access network infrastructure 111c initiates the secondary authentication process with the enterprise authentication server, as shown at 702c. At 704, the enterprise authentication server 123 determines whether UE 102 is to receive the SNPN provisioning service, as discussed above at 304 for FIG. 3A.

At 706a, the determining by the enterprise authentication server 123 that the UE 102 is to receive the SNPN credential provisioning service further includes validating whether the public MNO WWA access network/infrastructure 110c/111c (as may be identified via a PLMN ID; RAN identifiers such as Evolved Universal Mobile Telecommunications System (UMTS) Terrestrial RAN (E-UTRAN) Cell Global Identifiers (ECGIs) or New Radio (NR) Cell Global Identifiers (ECGIs); and/or the like) and potentially the access network location is/are in a whitelist or a blacklist to utilize the SNPN credential management/provisioning services and also validating, at 706b, the eligibility of UE 102 to participate in the SNPN credential management services/procedures.

Upon the enterprise authentication server 123 validating the public MNO access network/location for the public MNO WWA access network/infrastructure 110c/111c at 706a and validating the eligibility of UE 102 at 706b to participate in the SNPN credential management services/procedures, the remaining operations for FIGS. 7A and 7B as shown at 708, 710, 712, 714, 716, 718, 720, 722, 724, 726, 728, 730, 732a, 732b, 734, and 736 may be performed as discussed above for analogous operations 308, 310, 312, 314, 316, 318, 320, 322, 324, 326, 328, 330, 332a, 332b, 334, and 336 illustrated for FIGS. 3A and 3B except that, at 712, SSID is not included in the request from the enterprise authentication server 123 to the enterprise management system 121/SNPN credential manager logic 122 to initiate creation/generation of the SNPN credentials. Although not illustrated, it is to be understood that life-cycle management operations may also be performed for the public MNO WWA Off-premise use case 600 similar to those discussed above for FIG. 3C. In various embodiments, such techniques as illustrated for use case 600 may be applicable for both single radio (e.g., 5G only) and dual radio (e.g., Wi-Fi and 5G) capable UEs.

Figure 8:
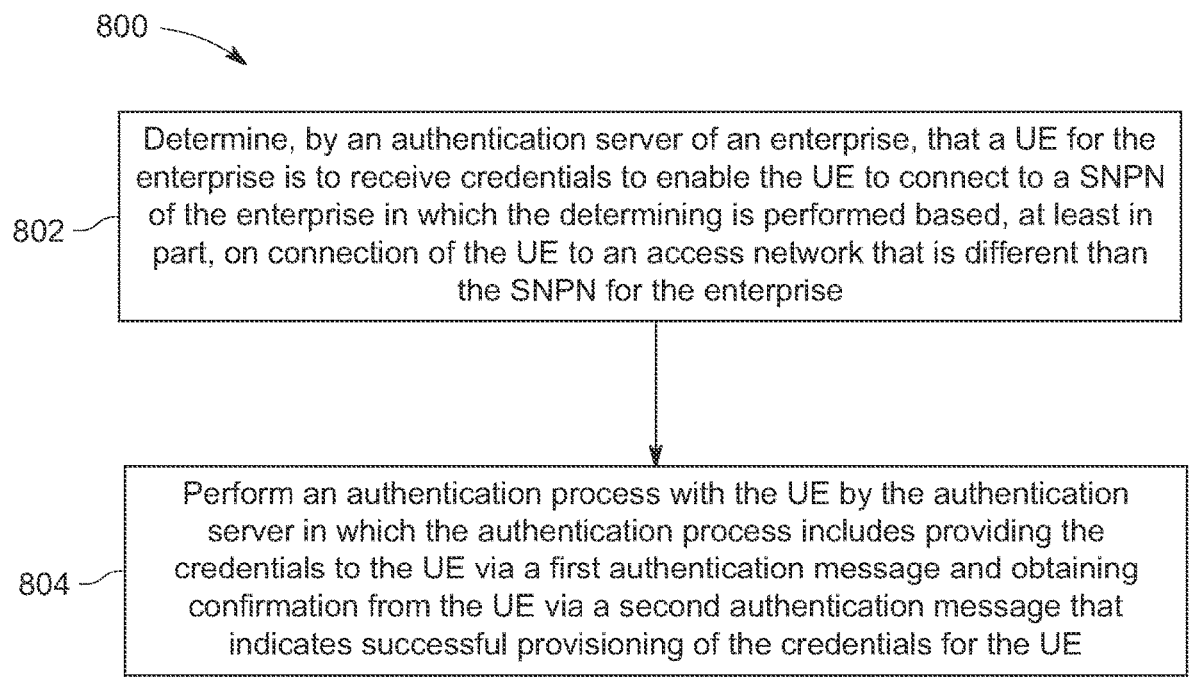
FIG. 8 is a flow chart depicting a method according to an example embodiment.

Referring to FIG. 8, FIG. 8 is a flow chart depicting a method 800 according to an example embodiment. In at least one embodiment, method 800 may be performed by an enterprise authentication server of an enterprise, such as enterprise authentication server 123 of enterprise network 120, as shown at least in FIGS. 1, 2, 4, and 6.

At 802, the method may include determining, by the authentication server of the enterprise, that a UE for the enterprise is to receive credentials to enable the UE to connect to a SNPN of the enterprise in which the determining is performed based, at least in part, on connection of the UE to an access network that is different than the SNPN for the enterprise.

For example, in one embodiment for UE association, the UE could request to the authentication server that it needs WWA/5G SNPN credentials mapped to a WLA SSID for enterprise WLA access network 110a and specific to a given location (e.g., a particular enterprise campus, site, building, etc.). In one embodiment, for example, a user for the UE could trigger the request through clicking a check box in an SSID profile section of the UE, thereby resulting in a new IE as part of an 802.11 Association request or through a new AVP object in EAP signaling to the authentication server during EAP authentication.

In another variation, the credential provisioning/management services for a UE could be enabled dynamically by an enterprise network for the authentication server on detecting that the device is WWA (4G/5G/nG) capable with support of eSIM and/or non-SIM credentials. In various embodiments, the WWA capability of a UE/device could be based on any combination of: device brand/eco-system analytics (e.g., based on device manufacturer, etc.); through use of an enterprise inventory that has device capabilities for each of an enterprise UE (enterprise UE identifier; and/or the like.

In one instance, the determining may further include validating the for eligibility of operation for the SNPN provisioning service (e.g., based on comparing a UE/device ID to one or more enterprise policies). In various embodiments, a UE/device ID may include any combination of: an IMEI, SUPI, PEI, an ICCID, a UUID, and/or the like. Further in some instances, the method may further include validating whether a public WLA access network/infrastructure is allowed to utilize the credential provisioning/management services. In some instances, such a validation may be performed based on an OpenRoaming RCOI and potentially location information for the WLA access network/infrastructure in comparison to a whitelist/blacklist that identifies allowed (in the whitelist) or not-allowed (in the blacklist) WLA access networks/infrastructures that may utilize the services. In still some instances, the determining may further include validating whether a public WWA access network/infrastructure is allowed to utilize the credential provisioning/management services. In some instances, such a validation may be performed based on a network/RAN ID for the public WWA access network/infrastructure and potentially location information for the WWA access network/infrastructure in comparison to a whitelist/blacklist identifies allowed or not-allowed WWA access networks/infrastructures that may utilize the services.

At 804, the method may include performing an authentication process (e.g., an EAP authentication process) with the UE by the authentication server in which the authentication process includes providing the credentials to the UE via a first authentication message (e.g., an EAP request message) and obtaining confirmation from the UE via a second authentication message (e.g., an EAP response message) that indicates successful provisioning of the credentials for the UE.

The first authentication message may be an EAP Request message communicated to the UE that includes the credentials provided via a signed credentials object, a credential type indicator, and an operation type indicator and the second message may be an EAP Response message obtained from the UE that includes an indication of successful provisioning of the credentials and a signed key identifying the credentials.

Accordingly, techniques presented herein may provide various features such as providing an ability for an enterprise network to deliver an SNPN credentials object (e.g., an eSIM profile or Non-SIM credentials) as an EAP AVP object to a UE that has completed authentication to the enterprise network via: 1) directly connecting to an enterprise Wi-Fi/ other access; 2) via an Open Roaming HotSpot that the enterprise network is part of; or 3) via a secondary authentication when connecting to a public 5G network.

Further, techniques presented herein may facilitate providing an indication from a UE for SNPN credentials and capability (eSIM profile or non-SIM credentials) over a new IE as part of an 802.11 Association request or through a new AVP in EAP-signaling to an authentication server during EAP authentication. Additionally, techniques herein may facilitate a determination by an enterprise network regarding the activation of an SNPN credentials service for different credential subtypes (eSIM or Non-SIM credentials) based on a UE's capability and network policy (e.g., enterprise user group [legal, engineering, management, etc.], service class [bronze, silver, etc.], and/or the like.

Further, techniques herein provide for the ability of an enterprise network to generate SNPN credentials [eSIM profile or non-SIM credentials] and related network metadata [APN, NID, PLMN) specific to an associated SSID and location. Still further, techniques herein may provide for the ability of an enterprise network to generate SNPN credentials [eSIM profile or non-SIM credentials] of one access (e.g., private 5G) based on successful authentication on another access (e.g., Wi-Fi) or another network (e.g., Open-Roaming/public MNO).

Still further, techniques herein may provide for the ability of an EAP supplicant logic for an enterprise UE to obtain a (signed) SNPN credentials object from an enterprise authentication server and interface with an enterprise application operating on the enterprise UE for eSIM profile installation on the UE's eUICC chip and/or installation of non-SIM credentials via the UE's memory/storage. Further, techniques herein may providing for the ability for EAP supplicant logic for an enterprise UE to handle SNPN credential operation commands from an enterprise authentication server (e.g., install, enable, disable, delete). Still further, techniques herein may provide for the ability for an enterprise application operating on an enterprise UE to validate the origin and integrity of a signed SNPN credentials object. Still further, techniques herein may provide for the ability of EAP supplicant logic for an enterprise UE to obtain a (signed) SNPN credential key from an enterprise authentication server for a credential delete/disable operation and to interface with an enterprise application to perform eSIM profile deletion on the UE's eUICC chip or deletion of non-SIM credentials on UE memory/storage.

Techniques for providing SNPN credential delivery/management as discussed herein may have many advantages. In at least one embodiment, the techniques may allow an enterprise to push credentials to: 1) an On-Premise (On-Prem) UE directly connected an enterprise Wi-Fi network; 2) to an Off-Premise (Off-Prem) UE connected to a public Wi-Fi Hotspot that is part of the OpenRoaming Consortium; and/or 3) to a UE connected to a mobile network operator's (MNO's) public 5G network using a service provider's (SP's) eSIM credentials through completion of a secondary authentication to the enterprise realm. In various embodiments, the 1) [On-Prem] and the 2) [Off-Prem] SNPN credential delivery/management techniques can be used with UEs having a dual radio capability or even 5G-only UEs having a MNO/SP subscription.

Figure 9:
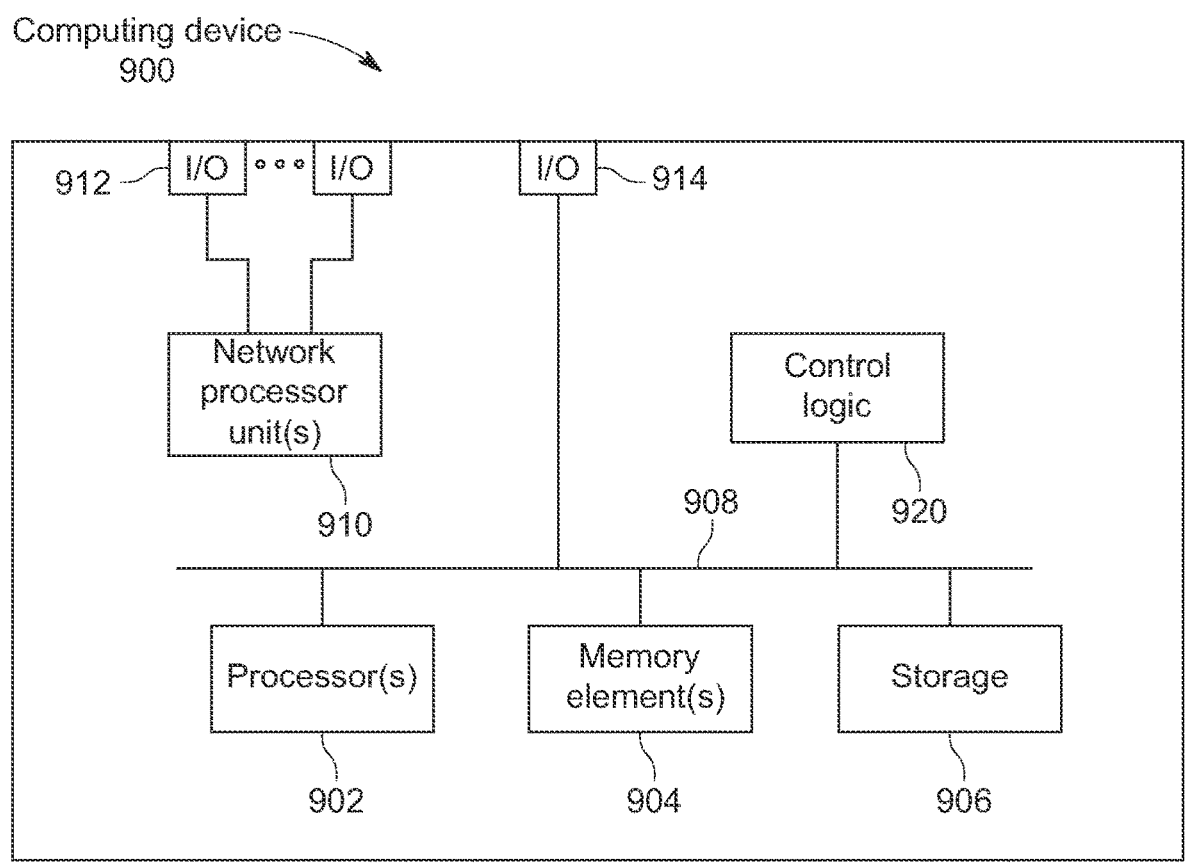
FIG. 9 is a hardware block diagram of a computing device that may perform functions associated with any combination of operations, in connection with the techniques discussed herein.

Referring to FIG. 9, FIG. 9 illustrates a hardware block diagram of a computing device 900 that may perform functions associated with operations discussed herein in connection with the techniques depicted in FIGS. 1-8. In various embodiments, a computing device, such as computing device 900 or any combination of computing devices 900, may be configured as any entity/entities as discussed for the techniques depicted in connection with FIGS. 1-8 in order to perform operations of the various techniques discussed herein.

In at least one embodiment, computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 (wired or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receiver(s)/transmitter(s)/transceiver(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s) and/or antenna(s)/antenna array(s) now known or hereafter developed. Thus, the network processor unit(s) 910 and/or network I/O interfaces 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein. In some instances, control logic 920 can be implemented as SNPN credential manager logic, such as SNPN credential manager logic 122 of enterprise management system 121.

Figure 10:
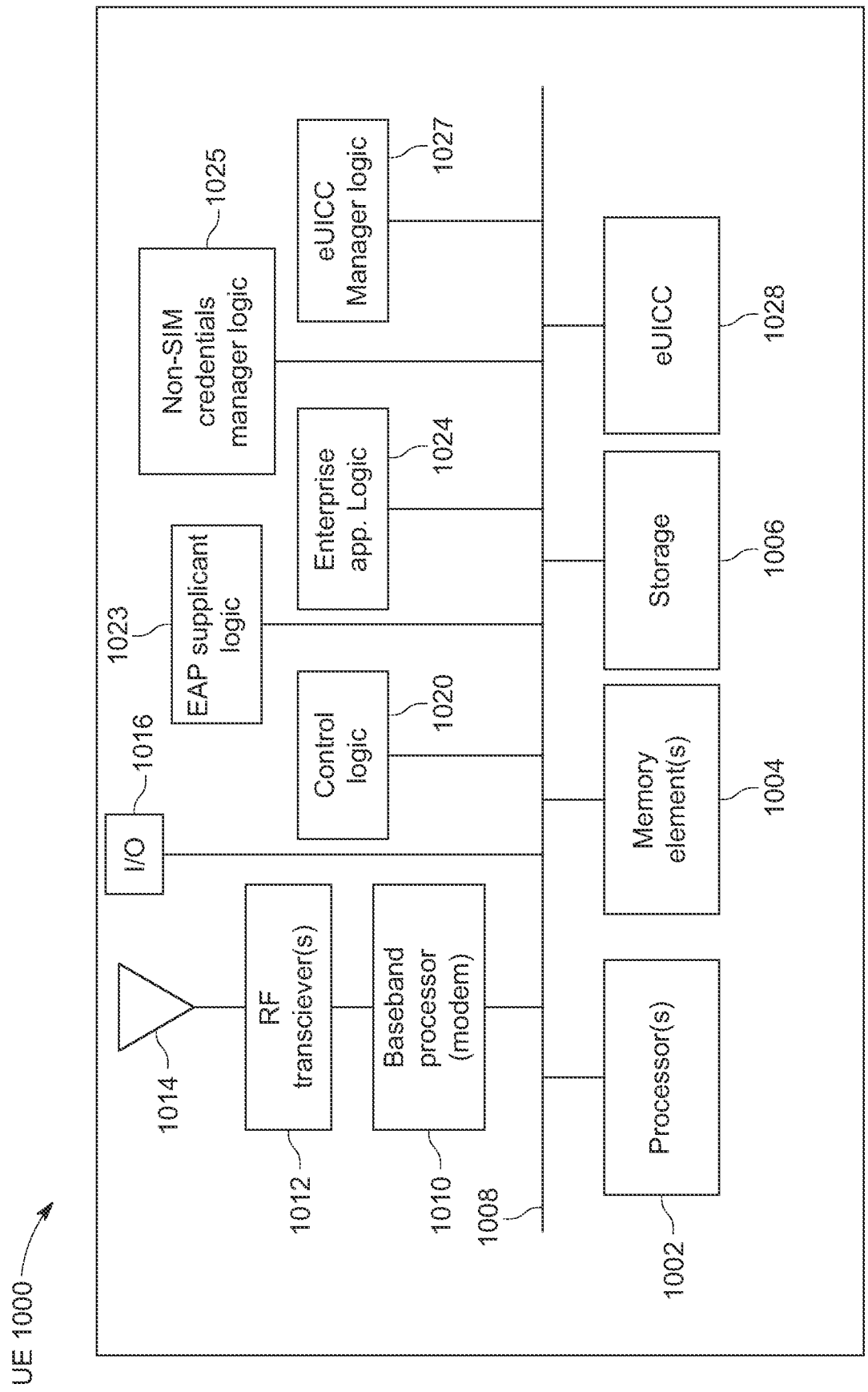
FIG. 10 is a hardware block diagram of a user equipment that may perform functions associated with any combination of operations, in connection with the techniques discussed herein.

Referring to FIG. 10, FIG. 10 illustrates a hardware block diagram of a user equipment (UE) 1000 that may perform functions associated with operations discussed herein in connection with the techniques depicted in FIGS. 1-8. In various embodiments, a UE, such as UE 1000 or any combination of UEs 1000, may be configured as UE 102 as discussed for the techniques depicted in connection with FIGS. 1-8 in order to perform operations of the various techniques discussed herein.

In at least one embodiment, UE 1000 may include one or more processor(s) 1002, one or more memory element(s) 1004, storage 1006, a bus 1008, a baseband processor or modem 1010, one or more radio RF transceiver(s) 1012, one or more antennas or antenna arrays 1014, one or more input/output (I/O) interface(s) 1016, control logic 1020, EAP supplicant logic 1023, enterprise application logic 1024, non-SIM credentials manager logic 1025, eUICC manager logic 1027, and an eUICC 1028. In various embodiments, instructions associated with logic for UE 1000 can overlap in any manner and are not limited to the specific allocation of instructions and/or operations described herein.

The one or more processor(s) 1002, one or more memory element(s) 1004, storage 1006, bus 1008, and I/O 1016 may be configured/implemented in any manner described herein, such as described above at least with reference to FIG. 9. In addition, memory element(s) 1004 and/or storage 1006 may be utilized to store non-SIM credentials, as discussed for embodiments herein. One or more eSIM profiles may be installed, activated, deactivated, deleted, etc. for eUICC 1028, utilizing techniques as discussed herein. The RF transceiver(s) 1012 perform RF transmission and RF reception of wireless signals, and the baseband processor (modem) 1010 performs baseband modulation and demodulation, etc. associated with such signals to enable wireless communications for UE 1000.

In various embodiments, control logic 1020, EAP supplicant logic 1023, enterprise application logic 1024, non-SIM credentials manager logic 1025, and eUICC manager logic 1027 can include instructions that, when executed, cause processor(s) 1002 to perform operations, which can include, but not be limited to, providing overall control operations of UE 1000; interacting with other entities, systems, logic, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920/1020, SNPN credential manager logic 122, EAP supplicant logic 103/1023, enterprise application logic 104/1024, non-SIM credentials manager logic 105/1025, and eUICC manager logic 107/1027) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), non-volatile RAM (NVRAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904/1006 and/or storage 906/1006 can store data, software, code, instructions (e.g., processor instructions), logic, parameters, combinations thereof, and/or the like used for operations described herein. This includes memory element(s) 904/1004 and/or storage 906/1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is performed that may include determining, by an authentication server of an enterprise, that a user equipment (UE) for the enterprise is to receive credentials to enable the UE to connect to a standalone non-public network (SNPN) of the enterprise, wherein the determining is performed based, at least in part, on connection of the UE to an access network that is different than the SNPN for the enterprise; and performing an authentication process with the UE by the authentication server, wherein the authentication process includes providing the credentials to the UE via a first authentication message and obtaining confirmation from the UE via a second authentication message that indicates successful provisioning of the credentials for the UE.

In various instances, the access network is one of: a wireless wide area access network or a wireless local area access network not operated by the enterprise; or a wireless local area access network of the enterprise.

In various instances, the SNPN of the enterprise is one or more of: a 3rd Generation Partnership Project (3GPP) Fourth Generation (4G) access network of the enterprise; a 3rd Generation Partnership Project (3GPP) Fifth Generation (5G) access network of the enterprise; a 3rd Generation Partnership Project (3GPP) next Generation (nG) access network of the enterprise; and a Citizens Broadband Radio Service (CBRS) access network of the enterprise.

In one instance, the first authentication message is an Extensible Authentication Protocol (EAP) Request message communicated to the UE that includes the credentials provided via a signed credentials object, a credential type indicator, and an operation type indicator. In one instance, the credential type indicator indicates one of: an electronic Subscriber Identity Module (eSIM) profile for the UE; or non-Subscriber Identity Module (non-SIM) credentials for the UE.

In one instance, the second authentication message is an Extensible Authentication Protocol (EAP) Response message obtained from the UE that includes an indication of successful provisioning of the credentials and a signed key identifying the credentials.

In one instance, the method may further include providing an indication to the UE to delete or disable the credentials via a third authentication message that includes the signed key identifying the credentials.

In one instance, the method may further include generating the credentials to enable the UE to connect to the SNPN of the enterprise based on one or more of: a location of the UE; and a service set identifier (SSID) associated with a wireless local area access network determined based on a location of the UE.

In one instance, the determining by the authentication server that the UE is to receive the credentials is based on one or more of: a device identifier for the UE; a Roaming Consortium Organizational Identifier (RCOI) associated with the access network to which the UE is connected; and a public wireless wide area access network identifier associated with the access network to which the UE is connected.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   determining, by an authentication server of an enterprise, that a user equipment (UE) for the enterprise is to receive credentials to enable the UE to connect to a wireless wide area (WWA) access network of a stand-alone non-public network (SNPN) of the enterprise, wherein the determining is performed through connection of the UE to an access network that is different than the WWA access network of the SNPN of the enterprise;
   performing a first authentication process between the authentication server and the UE to obtain a first authentication response from the UE to initiate a credential management procedure with the UE;
   upon obtaining the first authentication response from the UE, communicating, by the authentication server, a request to a credential manager of the enterprise that includes a location of the UE and indication of whether electronic Subscriber Identity Module (eSIM) credentials or non-SIM credentials are to be generated for the UE to obtain a signed credentials object including the credentials from the credential manager; and performing a second authentication process between the authentication server and the UE to send the signed credentials object to the UE and obtain a second authentication response from the UE that includes an indication of successful provisioning of the credentials.

2. The method of claim 1, wherein the access network that is different than the WWA access network of the SNPN of the enterprise is one of:
   a wireless wide area access network or a wireless local area access network not operated by the enterprise; or
   a wireless local area access network of the enterprise.

3. The method of claim 1, wherein the WWA access network of the SNPN of the enterprise is one or more of:
   a 3rd Generation Partnership Project (3GPP) Fourth Generation (4G) access network of the enterprise;
   a 3rd Generation Partnership Project (3GPP) Fifth Generation (5G) access network of the enterprise;
   a 3rd Generation Partnership Project (3GPP) next Generation (nG) access network of the enterprise; or
   a Citizens Broadband Radio Service (CBRS) access network of the enterprise.

4. The method of claim 1, wherein the first authentication process is a first Extensible Authentication Protocol (EAP) process and the second authentication process is a second EAP process.

5. The method of claim 4, wherein performing the second authentication process includes sending an EAP request to the UE that includes the signed credentials object and further includes a credential type indicator indicating one of an eSIM profile for the UE or non-SIM credentials for the UE and an operation type indicator that are generated via the credential manager of the enterprise.

6. The method of claim 1, wherein the second authentication response from the UE further includes a signed key identifying the credentials.

7. The method of claim 6, further comprising:
   providing an indication to the UE to delete or disable the credentials via an authentication request that includes the signed key identifying the credentials.

8. The method of claim 1, further comprising generating the credentials via the credential manager of the enterprise to enable the UE to connect to the WWA access network of the SNPN of the enterprise based on one or more of:
   a location of the UE; or
   a service set identifier (SSID) associated with a wireless local area access network determined based on a location of the UE.

9. The method of claim 1, wherein the determining by the authentication server that the UE is to receive the credentials is based on one or more of:
   a device identifier for the UE;
   a Roaming Consortium Organizational Identifier (RCOI) associated with the access network to which the UE is connected; or
   a public wireless wide area access network identifier associated with the access network to which the UE is connected.

10. One or more non-transitory computer readable storage media encoded with instructions that, when executed by a processor, cause the processor to perform operations, comprising:
    determining, by an authentication server of an enterprise, that a user equipment (UE) for the enterprise is to receive credentials to enable the UE to connect to a wireless wide area (WWA) access network of a standalone non-public network (SNPN) of the enterprise, wherein the determining is performed through connection of the UE to an access network that is different than the WWA access network of the SNPN of the enterprise;
    performing a first authentication process between the authentication server and the UE to obtain a first authentication response from the UE to initiate a credential management procedure with the UE;
    upon obtaining the first authentication response from the UE, communicating, by the authentication server, a request to a credential manager of the enterprise that includes a location of the UE and indication of whether electronic Subscriber Identity Module (eSIM) credentials or non-SIM credentials are to be generated for the UE to obtain a signed credentials object including the credentials from the credential manager; and
    performing a second authentication process between the authentication server and the UE to send the signed credentials object to the UE and obtain a second authentication response from the UE that includes an indication of successful provisioning of the credentials.

11. The media of claim 10, wherein the first authentication process is a first Extensible Authentication Protocol (EAP) process and the second authentication process is a second EAP process.

12. The media of claim 11, wherein performing the second authentication process includes sending an EAP request to the UE that includes the signed credentials object and further includes a credential type indicator indicating one of an eSIM profile for the UE or non-SIM credentials for the UE and an operation type indicator that are generated via the credential manager of the enterprise.

13. The media of claim 10, wherein the second authentication response from the UE further includes a signed key identifying the credentials.

14. The media of claim 13, further comprising instructions that, when executed by the processor, cause the processor to perform further operations, comprising:
    providing an indication to the UE to delete or disable the credentials via an authentication request that includes the signed key identifying the credentials.

15. An authentication server of an enterprise, comprising:
    at least one memory element for storing data; and
    at least one processor for executing instructions associated with the data, wherein executing the instructions causes the authentication server to perform operations, comprising:
      determining, by an authentication server of an enterprise, that a user equipment (UE) for the enterprise is to receive credentials to enable the UE to connect to a wireless wide area (WWA) access network of a standalone non-public network (SNPN) of the enterprise, wherein the determining is performed through connection of the UE to an access network that is different than the WWA access network of the SNPN of the enterprise;
      performing a first authentication process between the authentication server and the UE to obtain a first authentication response from the UE to initiate a credential management procedure with the UE;
      upon obtaining the first authentication response from the UE, communicating, by the authentication server, a request to a credential manager of the enterprise that includes a location of the UE and indication of whether electronic Subscriber Identity Module (eSIM) credentials or non-SIM credentials are to be generated for the UE to obtain a signed credentials object including the credentials from the credential manager; and performing a second authentication process between the authentication server and the UE to send the signed credentials object to the UE and obtain a second authentication response from the UE that includes an indication of successful provisioning of the credentials.

16. The authentication server of claim 15, wherein the access network is one of:
   a wireless wide area access network or a wireless local area access network not operated by the enterprise; or
   a wireless local area access network of the enterprise.

17. The authentication server of claim 15, wherein the SNPN of the enterprise is one or more of:
   a 3rd Generation Partnership Project (3GPP) Fourth Generation (4G) access network of the enterprise;
   a 3rd Generation Partnership Project (3GPP) Fifth Generation (5G) access network of the enterprise;
   a 3rd Generation Partnership Project (3GPP) next Generation (nG) access network of the enterprise; or
   a Citizens Broadband Radio Service (CBRS) access network of the enterprise.

18. The authentication server of claim 15, wherein the first authentication process is a first Extensible Authentication Protocol (EAP) process and the second authentication process is a second EAP process.

19. The authentication server of claim 18, wherein performing the second authentication process includes sending an EAP request to the UE that includes the signed credentials object and further includes a credential type indicator indicating one of an eSIM profile for the UE or non-SIM credentials for the UE and an operation type indicator that are generated via the credential manager of the enterprise.

20. The authentication server of claim 19, wherein executing the instructions causes the authentication server to perform further comprising:
   providing an indication to the UE to delete or disable the credentials via an authentication request that includes a signed key identifying the credentials.

* * * * *